US012011955B2

United States Patent
Haesemeyer

(10) Patent No.: US 12,011,955 B2
(45) Date of Patent: Jun. 18, 2024

(54) MODULAR TIRE PRESSURE MONITORING SYSTEM (TPMS) SENSOR WITH EASILY REMOVABLE AND REPLACEABLE BATTERY

(71) Applicant: ASTRA SENSOR TECHNOLOGIES CORP., Superior, CO (US)

(72) Inventor: Christian Haesemeyer, Superior, CO (US)

(73) Assignee: ASTRA SENSOR TECHNOLOGIES CORP., Superior, CO (US)

( * ) Notice: Subject to any disclaimer, the term of this patent is extended or adjusted under 35 U.S.C. 154(b) by 0 days.

(21) Appl. No.: 18/410,672

(22) Filed: Jan. 11, 2024

(65) Prior Publication Data

US 2024/0140145 A1 May 2, 2024

Related U.S. Application Data

(63) Continuation-in-part of application No. 18/349,023, filed on Jul. 7, 2023, which is a continuation of (Continued)

(51) Int. Cl.
*B60C 23/04* (2006.01)

(52) U.S. Cl.
CPC ...... *B60C 23/0408* (2013.01); *B60C 23/0494* (2013.01)

(58) Field of Classification Search
CPC .................. B60C 23/0408; B60C 23/0494
(Continued)

(56) References Cited

U.S. PATENT DOCUMENTS 6,194,998 B1 2/2001 Huang
6,351,990 B1 * 3/2002 McInnes ............. B60C 23/0496
73/146.8

(Continued)

FOREIGN PATENT DOCUMENTS

AU 2012231230 A1 10/2013
CN 101844490 A 9/2010
(Continued)

OTHER PUBLICATIONS

Autel—300100—Tesla BLE TPMS MX-Sensor, UHS Hardware, retrieved from: https://www.uhs-hardware.com/products/autel-300100-tesla-ble-tpms-mx-sensor?variant=40566825844803/?dfw_tracker=93526-AUTEL-300100&msclkid=34694d826fcf173f8ded281fe32b5dc6&utm_source=bing&utm_medium=cpc&utm_campaign=Autel_Shopping_Smart&utm_term=4585788125027048&utm_content=Ad%20group, on Jan. 9, 2024, 8 pgs.

*Primary Examiner* — Eric Blount
(74) *Attorney, Agent, or Firm* — HOLLOWELL PATENT GROUP; Kelly Hollowell

(57) ABSTRACT

A modular TPMS sensor with an externally replaceable battery is disclosed. The valve stem facilitates battery replacement with a valve stem core designed to removably secure a battery within the valve stem and a sensor configured with an electrical connection designed to connect the sensor to power from the battery. The valve stem has an interior cavity configured to retain the valve stem core. The battery may be at least partially retained within the valve stem. The removable sensor may be configured to connect to an end of the valve stem distal from the valve stem core. The electrical connection may comprise a spring-loaded terminal configured to connect or disconnect the sensor and battery as the battery is inserted or removed from the valve stem through a valve stem end proximal to the valve stem core, permitting battery replacement without removing or deflating a tire configured with the sensor.

24 Claims, 19 Drawing Sheets

Related U.S. Application Data application No. 18/154,914, filed on Jan. 16, 2023, now Pat. No. 11,738,607.

(60) Provisional application No. 63/388,415, filed on Jul. 12, 2022.

(58) Field of Classification Search
USPC .......................................... 340/442–444, 447
See application file for complete search history.

(56) References Cited

U.S. PATENT DOCUMENTS

| | | | |
|---|---|---|---|
| 6,535,116 | B1 | 3/2003 | Zhou |
| 6,817,235 | B2 * | 11/2004 | Sapir .................... B60C 23/004 |
| | | | 73/146 |
| 6,993,962 | B1 | 2/2006 | Ko |
| 7,116,036 | B2 | 10/2006 | Balasubramaniam et al. |
| 7,161,476 | B2 | 1/2007 | Hardman et al. |
| 8,915,130 | B1 | 12/2014 | Huang |
| 10,471,780 | B2 | 11/2019 | Matlow |
| 11,007,828 | B2 * | 5/2021 | Cheng ................. B60C 23/0447 |
| 11,090,987 | B1 | 8/2021 | Hampton |
| 11,453,257 | B2 | 9/2022 | Avalur Nagarajan et al. |
| 2018/0126805 | A1 | 5/2018 | Ramsubagh et al. |

FOREIGN PATENT DOCUMENTS

| | | | |
|---|---|---|---|
| JP | 2016130049 | A | 7/2016 |
| KR | 100778651 | B1 | 11/2007 |
| WO | 9952722 | A1 | 10/1999 |
| WO | 2016016099 | A1 | 2/2016 |

\* cited by examiner

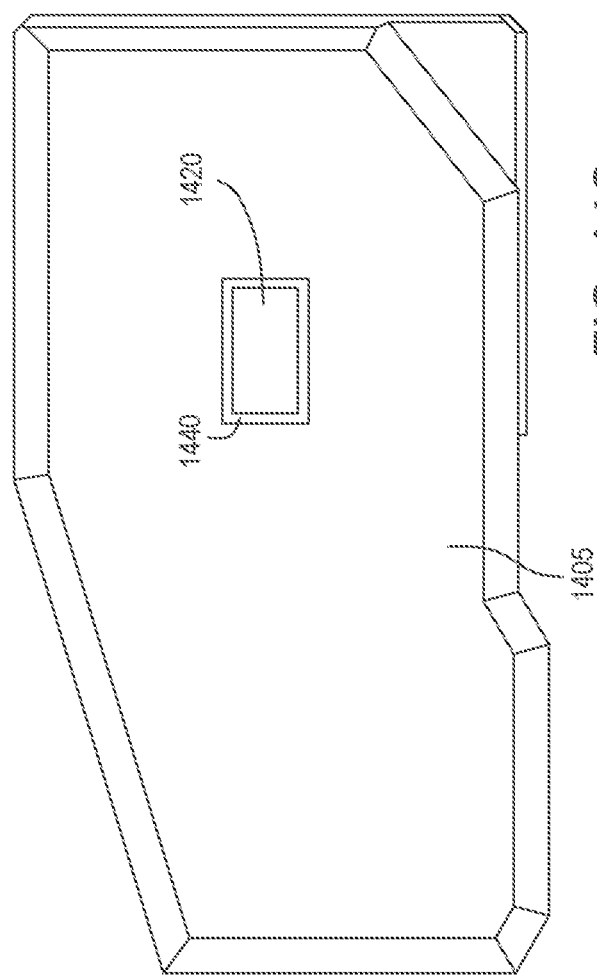

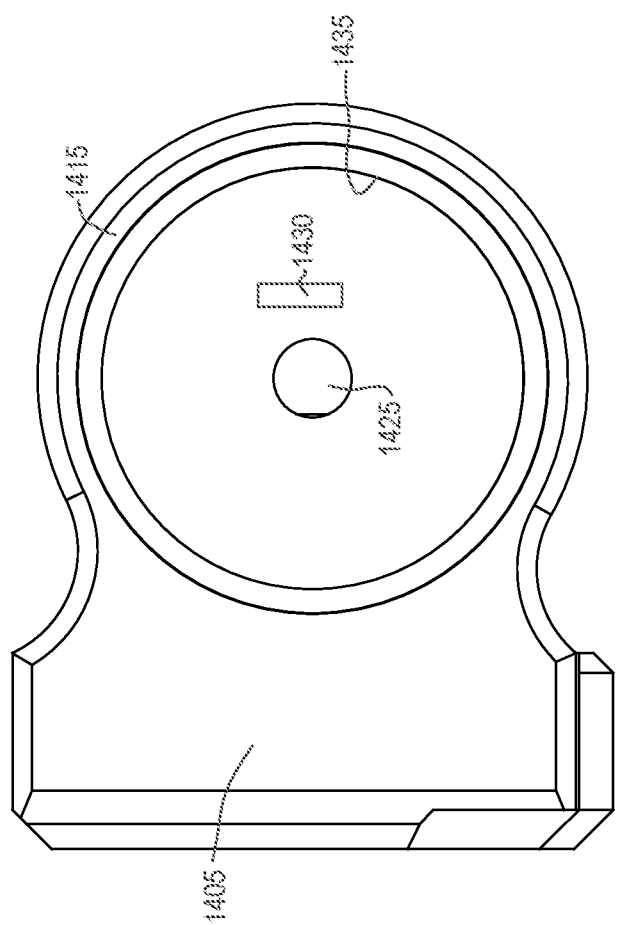

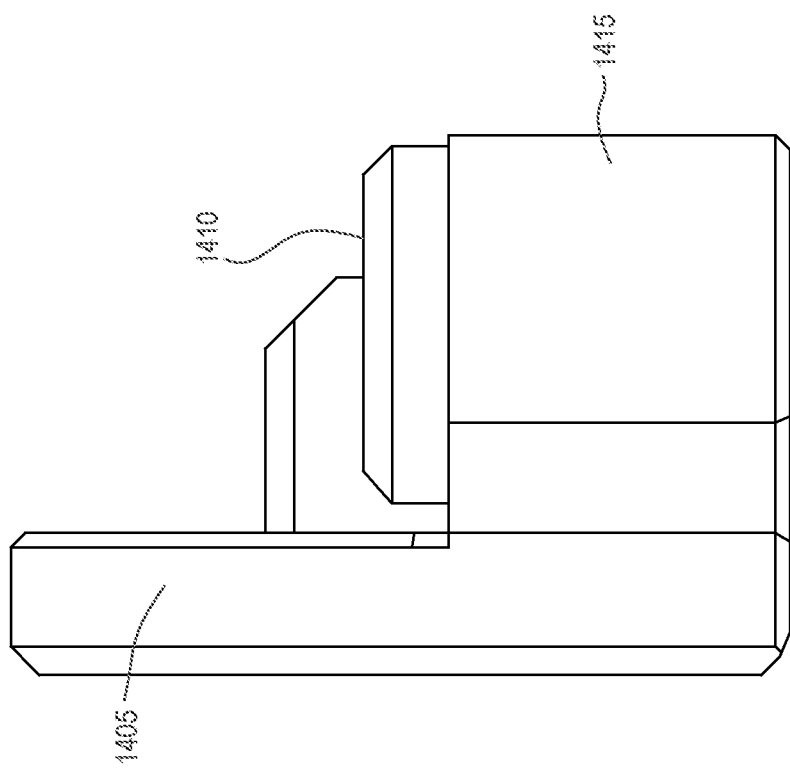

MODULAR TIRE PRESSURE MONITORING SYSTEM (TPMS) SENSOR WITH EASILY REMOVABLE AND REPLACEABLE BATTERY

CROSS-REFERENCE TO RELATED APPLICATIONS

This application is a continuation-in-part of U.S. patent application Ser. No. 18/349,023 filed by inventor Christian Haesemeyer on Jul. 7, 2023, entitled "Tire Pressure Monitoring System (TPMS) Sensor with Easily Removable and Replaceable Battery." U.S. patent application Ser. No. 18/349,023 is a continuation of U.S. patent application Ser. No. 18/154,914 filed by inventor Christian Haesemeyer on Jan. 16, 2023, entitled "Tire Pressure Monitoring System (TPMS) Sensor with Easily Removable And Replaceable Battery," and claims the benefit of and priority to U.S. Provisional Application No. 63/388,415 filed by inventor Christian Haesemeyer on Jul. 12, 2022, entitled "Tire Pressure Monitoring System (TPMS) Sensor with Integrated Battery," and the entire contents of each of the above-cited applications are incorporated by reference in their entirety herein for all purposes.

TECHNICAL FIELD

This invention generally relates to the field of vehicle tire pressure monitoring and battery removal or replacement for tire pressure monitoring systems.

BACKGROUND OF THE INVENTION

Tires are wheel coverings. Tires cover wheel surfaces that may contact a road. A tire mounted to a wheel rim may increase traction as the wheel rolls over a road surface or may reduce wear and absorb vibration resulting from rugged terrain. Tires are a result of transportation engineering which includes both mechanical and automotive design. Tires protect wheels and improve transportation safety by surrounding a wheel's rim with a material designed to tolerate wear and reduce vibration. A tire may be made from rubber. Some tires may be inflatable. For example, an inflatable tire may support a vehicle's weight using pressurized air contained within the inflatable tire body.

Users of inflatable tires include individuals and organizations deploying vehicles for individual passengers, public transportation, commercial delivery, and construction operations. An inflatable tire that is not inflated to at least a pressure sufficient to support the load that is being carried may be a safety hazard. An inflatable tire may lose air pressure with the passage of time. For example, an inflatable tire may have a slow leak or air pressure in a tire may drop to an unsafe level due to a drop in atmospheric temperature. An inflatable tire user may expend significant effort manually checking the air pressure in their tires. When a tire's air pressure drops to an unsafe level air must be added to the tire.

An inflatable tire user may employ a Tire Pressure Monitoring System (TPMS) to monitor air pressure in their tires. Using a TPMS may permit an inflatable tire user to periodically check air pressure in their tires. In an illustrative example, a TPMS may include a central monitor communicatively coupled with a battery-powered sensor in each wheel. The battery-powered sensor in each wheel may be configured to send tire pressure readings to the central monitor. The central monitor may alert the user if tire pressure drops to a threshold pressure in a monitored tire. The batteries powering the TPMS sensors will eventually fail, preventing the inflatable tire user from using the TPMS to monitor the air pressure in their tires. An inflatable tire user may have to remove wheels from their vehicle or have their TPMS sensors serviced by a professional mechanic to restore their tire air pressure monitoring capability. Restoring tire air pressure monitoring capability when a TPMS sensor battery fails is costly, time-consuming, dangerous, and may require a professional mechanic to replace the batteries and/or sensors of the TPMS system. The user may expend substantial effort and expense to restore the operation of their TPMS when a battery fails. What is needed is a TPMS sensor with an externally replaceable battery.

SUMMARY OF THE INVENTION

A modular TPMS sensor with an externally replaceable battery is disclosed. The valve stem facilitates battery replacement with a valve stem core designed to removably secure a battery within the valve stem and a sensor configured with an electrical connection designed to connect the sensor to power from the battery. The valve stem has an interior cavity configured to retain the valve stem core. The battery may be at least partially retained within the valve stem. The valve stem is separatable from the sensor, connecting through a connector. The sensor may be configured in a sensor body connected to an end of the valve stem distal from the valve stem core. The electrical connection may comprise a spring-loaded terminal configured to connect or disconnect the sensor and battery as the battery is inserted or removed from the valve stem through a valve stem end proximal to the valve stem core, permitting battery replacement without removing or deflating a tire configured with the sensor.

BRIEF DESCRIPTION OF THE DRAWINGS

FIG. 14C depicts a back view of the sensor attachment component of the alternative, modular design.

FIG. 14E depicts a left view of the sensor attachment component of the alternative, modular design.

FIG. 14F depicts a top view of the sensor attachment component of the alternative, modular design.

DETAILED DESCRIPTION OF THE INVENTION

The detailed description explains exemplary implementations of the present invention, together with advantages, features, and exemplary embodiments with reference to the drawings, in which similar numbers refer to similar parts throughout the drawings. Apparatus and process implementations described or depicted herein are examples. There may be many variations to these apparatus or process implementations and the exemplary descriptions or depictions of the elements or operations described therein without departing from the spirit of the invention. For instance, the operations may be performed in a differing order, operations may be added, deleted, or modified, elements may be combined in a different manner, or the elements may be supplemented with other elements. All these variations are considered to be within the scope of the claimed invention.

Figure 1:
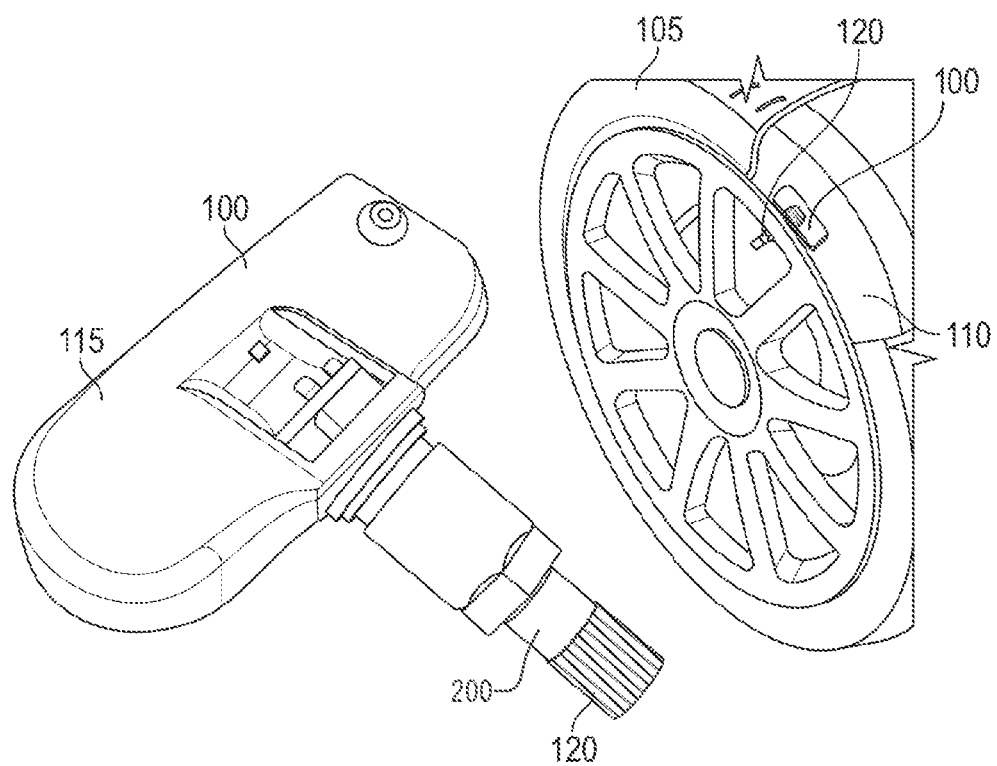
FIG. 1 depicts an exemplary usage scenario of a TPMS sensor implementation.

FIG. 1 depicts an exemplary scenario using a TPMS sensor with an integrated battery that is replaceable externally without removing the TPMS sensor from a tire rim, without removing the tire rim from a vehicle and without deflating the tire. In FIG. 1, the Tire Pressure Monitoring System (TPMS) sensor assembly 100 is configured to monitor air pressure in the tire 105 mounted on the tire rim 110. In the depicted implementation, the TPMS sensor assembly 100 includes the sensor body 115, valve stem 200, and the air cap 120. The sensor body 115 houses an air pressure sensor and electronics operating on battery power from the TPMS sensor assembly 100. The electronics in the sensor body 115 may be configured to communicatively couple the air pressure sensor to a central monitor in the vehicle. The sensor body 115 may include a radio frequency transmitter configured to send information about air pressure in the tire 105 from the air pressure sensor to the central monitor in the vehicle. When the battery power from the TPMS sensor assembly 100 fails the TPMS sensor assembly 100 will stop sending information about air pressure in the tire 105 unless the user replaces the failed battery.

Figure 2:
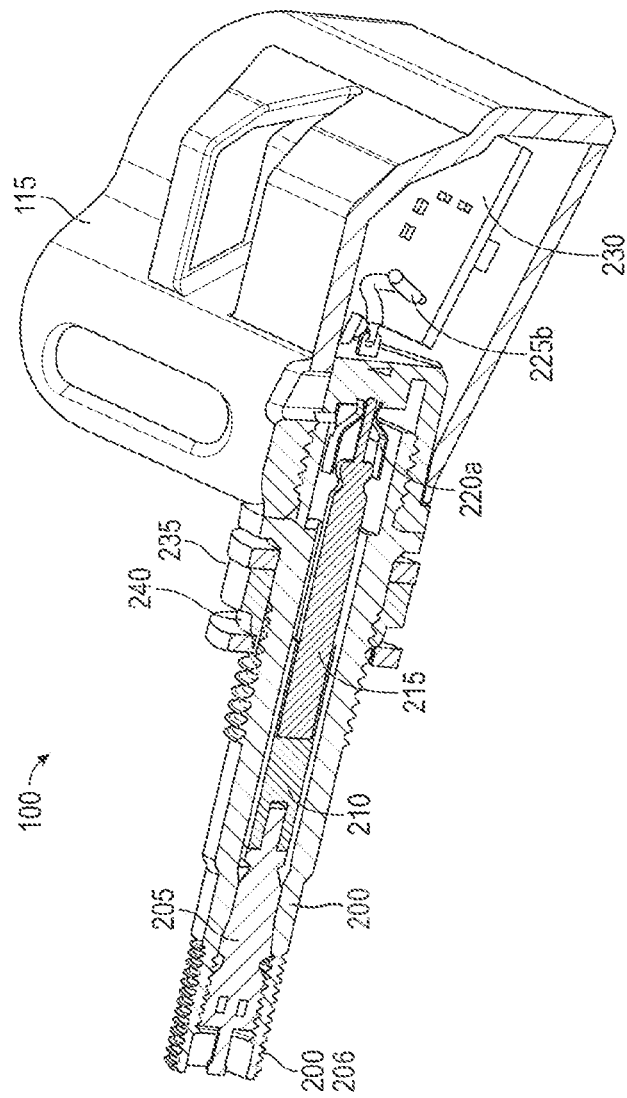
FIG. 2 depicts a side cross-sectional cutaway view of an exemplary TPMS sensor implementation.

Turning to FIG. 2, the TPMS sensor assembly 100 includes the valve stem 200 configured with the valve stem core 205. The valve stem core 205 may be disposed at least partially within the valve stem 200. The valve stem 200 and the valve stem core 205 are configured to removably secure the battery 215 within the valve stem 200. The battery 215 may be disposed at least partially within the valve stem 200, permitting the user to replace the failed battery through the valve stem 200, without removing the TPMS sensor assembly 100 from the tire rim 110, without removing the tire rim 110 from the vehicle and without deflating the tire 105. The exemplary TPMS sensor assembly 100 design integrates the battery 215 into the valve stem 200 to permit the user to replace the battery 215 externally from the TPMS sensor assembly 100. For example, replacing battery 215 in the TPMS sensor assembly 100 installed in a tire rim 110 with a tire 105 on a vehicle may comprise: removing the valve stem core 205 from an interior cavity of the valve stem 200; pulling the battery 215 out from within the valve stem 200; pushing another battery 215 into the valve stem 200; and replacing the valve stem core 205 in the valve stem 200, without deflating the tire 105 or removing the tire rim 110 from the vehicle.

Figure 9:
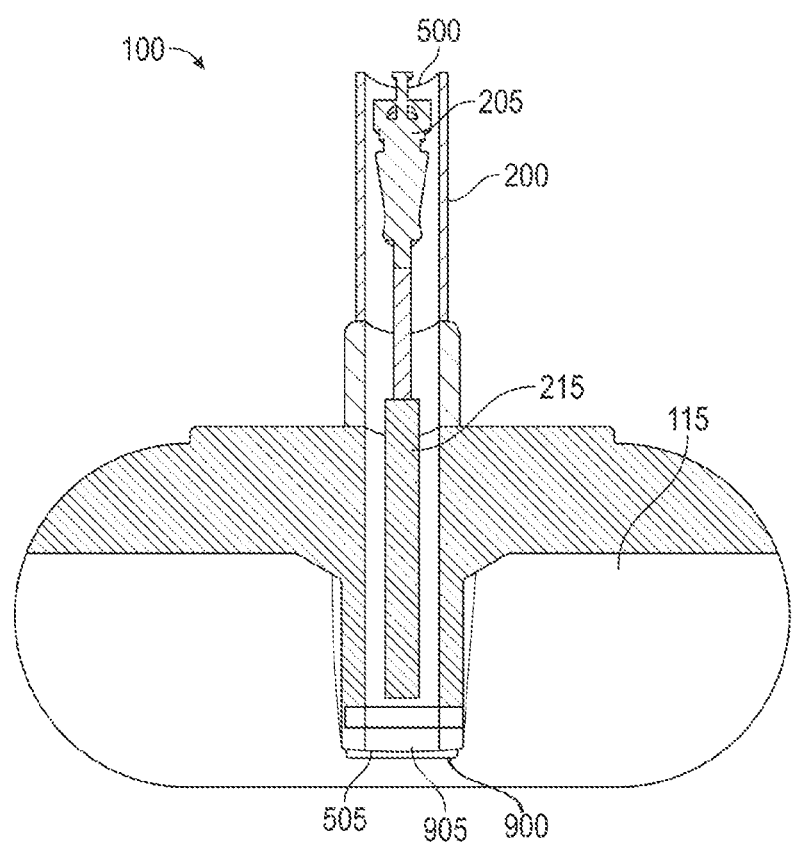
FIG. 9 depicts a front cross-sectional view of an exemplary TPMS sensor implementation, taken along the lines I-I shown in FIG. 5.

With continued reference to FIG. 2, the depicted TPMS sensor assembly 100 implementation includes the battery retaining clip 210 designed to removably secure the battery 215 within the valve stem 200 between the valve stem core 205 and the air pressure sensor and electronics housed by the sensor body 115. The battery retaining clip 210 depicted in FIG. 2 may be omitted from a TPMS sensor assembly 100 implementation depending on the structural size and shape of the battery 215. For example, FIG. 9 depicts an exemplary TPMS sensor assembly 100 implementation without the battery retaining clip 210. In the implementation depicted by FIG. 9, the valve stem core 205 removably secures the battery 215 within the valve stem 200, permitting the user to replace the failed battery through the valve stem 200 in accordance with the battery replacement method disclosed above. In addition to the battery replacement method disclosed above, replacing battery 215 in a TPMS sensor assembly 100 implementation that includes a battery retaining clip 210 may further comprise removing the valve stem core 205 from an interior cavity of the valve stem 200, wherein the valve stem core is engaged with the battery retaining clip 210 and the battery retaining clip 210 is engaged with the battery 215; removing the battery 215 from the battery retaining clip 210; engaging another battery 215 with the battery retaining clip 210 and engaging the battery retaining clip 210 with the valve stem core 205; and replacing the valve stem core 205 in the valve stem 200. The valve stem core 205 may be coupled with the battery retaining clip 210 and configured to removably secure the battery 215 within the valve stem 200. The battery 215 may be at least partially retained within the battery retaining clip 210.

Figure 3:
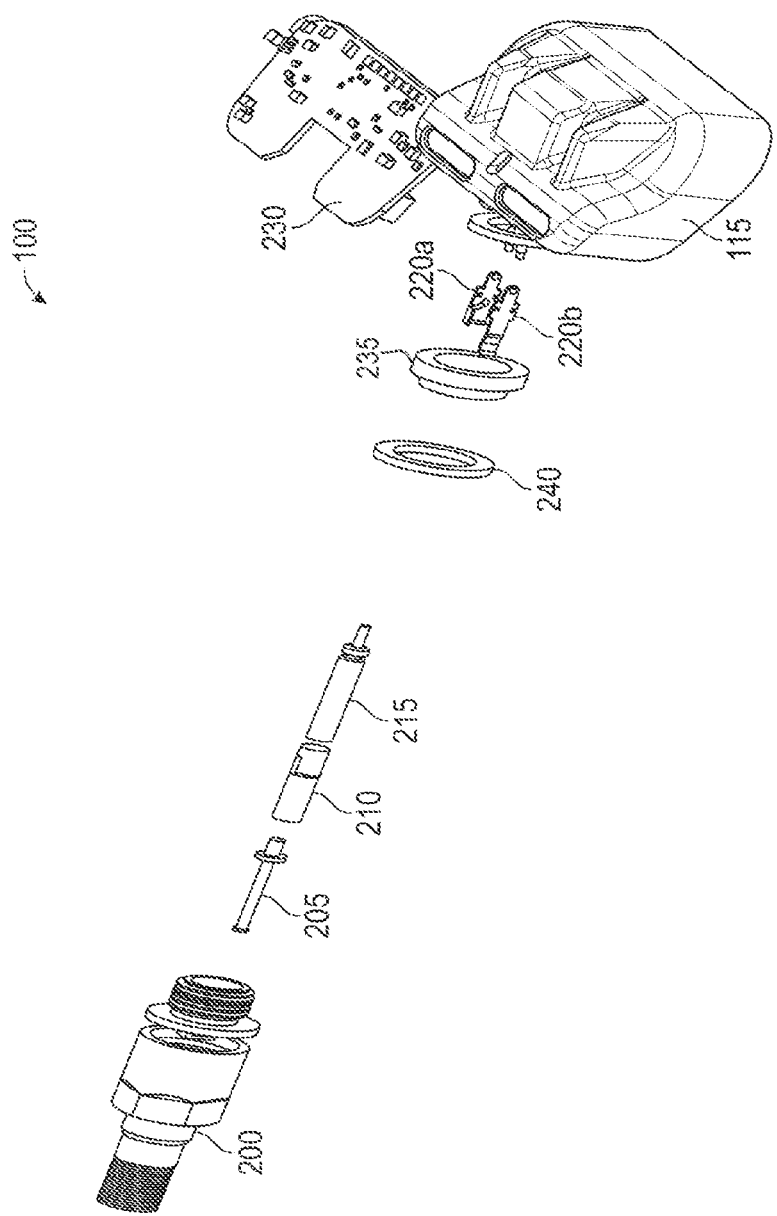
FIG. 3 depicts an exploded view of an exemplary TPMS sensor implementation.
Figure 4:
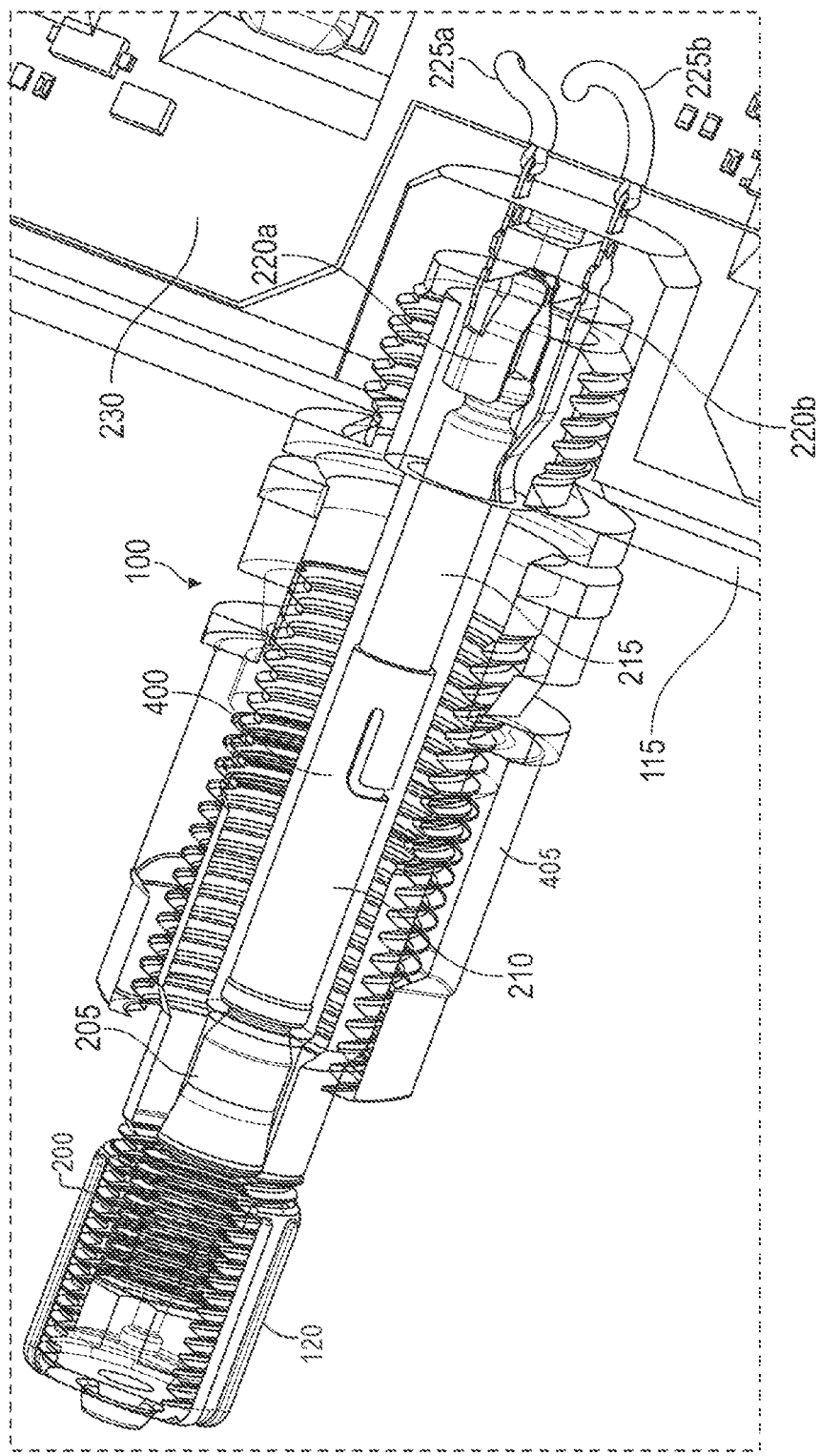
FIG. 4 depicts a top perspective cutaway view of an exemplary TPMS sensor implementation.

With continued reference to FIGS. 2, 3, and 4, the depicted TPMS sensor assembly 100 implementation includes the electrical contact 220a,b pair and wiring 225a,b configured to electrically connect the battery 215 to the air pressure sensor 230 and electronics housed by the sensor body 115. In the depicted implementation, the valve stem 200 is secured to the sensor body 115 using the nut 235 and the washer 240. The battery 215 may be at least partially retained within the valve stem 200. The battery 215 may be substantially cylindrical in shape. The battery 215 may be shaped to fit within a tubular structure. The sensor 230 may be configured in the sensor body 115 connected to an end of the valve stem 200 distal from the valve stem core 205. An electrical connection comprising the electrical contact 220a, the electrical contact 220b, wiring 225a, and wiring 225b may include a spring-loaded terminal configured to connect or disconnect the sensor 230 and battery 215 as the battery 215 is inserted or removed from the valve stem 200 through a valve stem end proximal to the valve stem core 205, permitting battery 215 replacement without removing or deflating a tire 105 configured with the TPMS sensor assembly 100.

Multiple TPMS sensor assembly 100 units may be used on a single vehicle. In an illustrative example, one TPMS sensor assembly 100 may be installed per tire 105. The TPMS sensor assembly 100 may be inserted through an existing valve stem hole on the tire rim 110 and mounted to the tire rim 110. After mounting to the tire rim 110, the tire 105 is mounted onto the tire rim 110 and reinflated to a correct level of inflation, with the correct amount of air pressure for each tire. The air pressure sensor 230 within each TPMS sensor assembly 100 may be calibrated and configured to detect a level of air pressure for each tire 105. The TPMS sensor assembly 100 units may be configured to communicate information about air pressure, temperature, location, and battery charge to a central monitor configured in the vehicle. In an illustrative example the central monitor may be configured in the vehicle's Engine Control Module (ECM) or On-Board Diagnostics (OBD) unit. The vehicle's central monitor may indicate to the driver if low tire pressure has been detected in any tire 105 of the vehicle. The vehicle's central monitor may illuminate a TPMS warning light or indicate on a dashboard notification when one or more tire 105 are significantly underinflated (for example, 25% of vehicles recommended air pressure or 20 psi, whichever is greater).

FIG. 3 depicts an exploded view of an exemplary TPMS sensor implementation. In FIG. 3, the TPMS sensor assembly 100 implementation includes at least the features described herein with reference to FIGS. 1 and 2. The battery retaining clip 210 depicted in FIG. 3 may be omitted from an implementation of the TPMS sensor assembly 100 depending on the structural size and shape of the battery 215, as disclosed with reference to FIG. 2.

Figure 11:
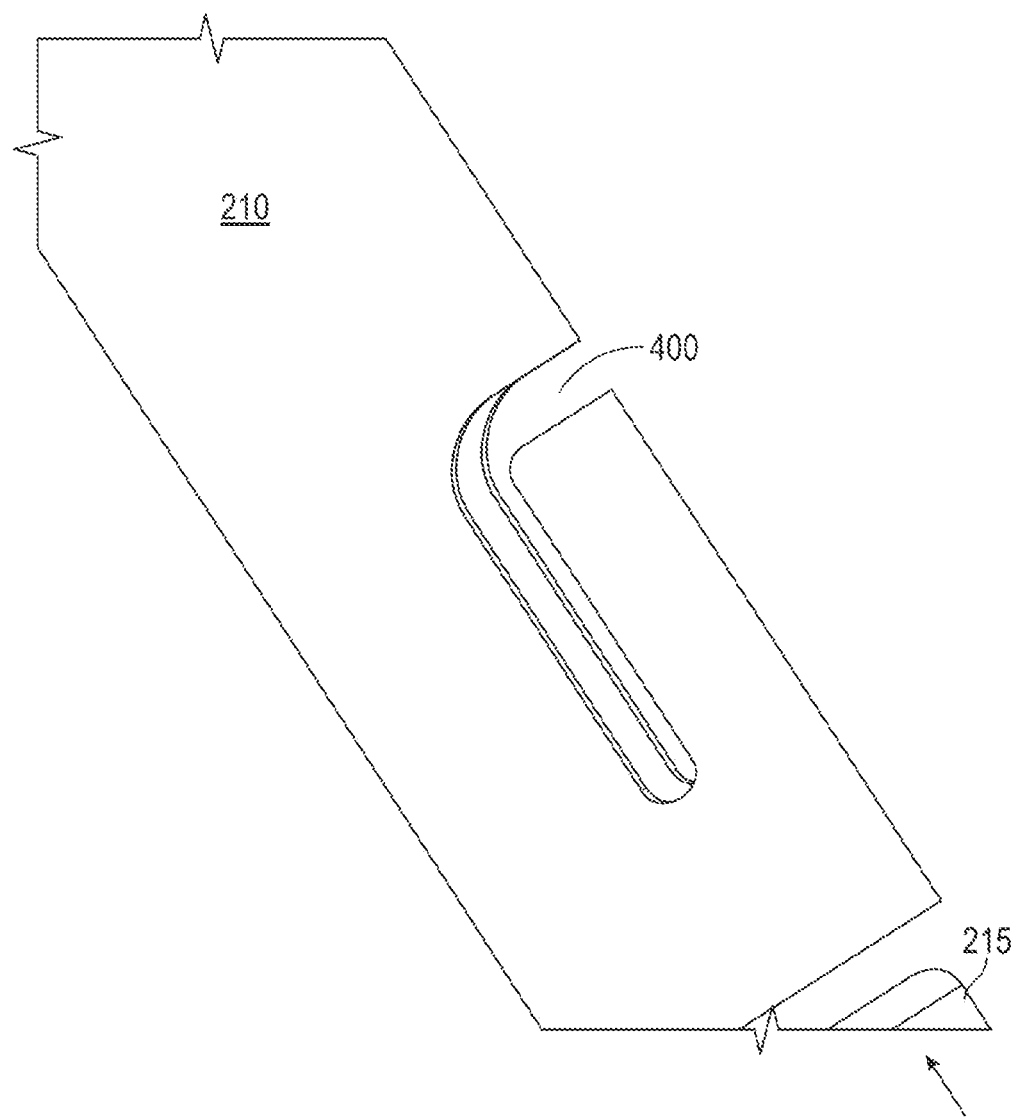
FIG. 11 depicts a perspective view of an exemplary battery retaining clip.

FIG. 4 depicts a top perspective cutaway view of an exemplary TPMS sensor implementation. In FIG. 4, the TPMS sensor assembly 100 implementation includes at least the features described herein with reference to FIGS. 1, 2 and 3. In FIG. 4, the TPMS sensor assembly 100 battery retaining clip 210 includes the attachment slot 400. The attachment slot 400 may be a snap-in attachment point to secure an exemplary battery 215, an exemplary valve stem core 205 or an exemplary valve stem 200 to the battery retaining clip 210. The battery 215 may be configured with a bead, tab or prong designed to snap-in to the attachment slot 400. The valve stem core 205 may be configured with a bead, tab or prong designed to snap-in to the attachment slot 400. An inner surface of the valve stem 200 may be configured with a bead, tab or prong designed to snap-in to the attachment slot 400. FIG. 11 depicts a perspective detail view of an exemplary attachment slot 400. In the implementation depicted by FIG. 11, the attachment slot 400 extends through the battery retaining clip 210 with two substantially right-angle bends, one bend at the front and another bend behind the depicted battery retaining clip 210. In an illustrative example the attachment slot 400 may act as a snap-in attachment point for the valve stem core 205 for the battery 215. The valve stem core 205 could have screw threads about halfway down the valve stem core 205 to receive a tire nut 405.

Figure 5:
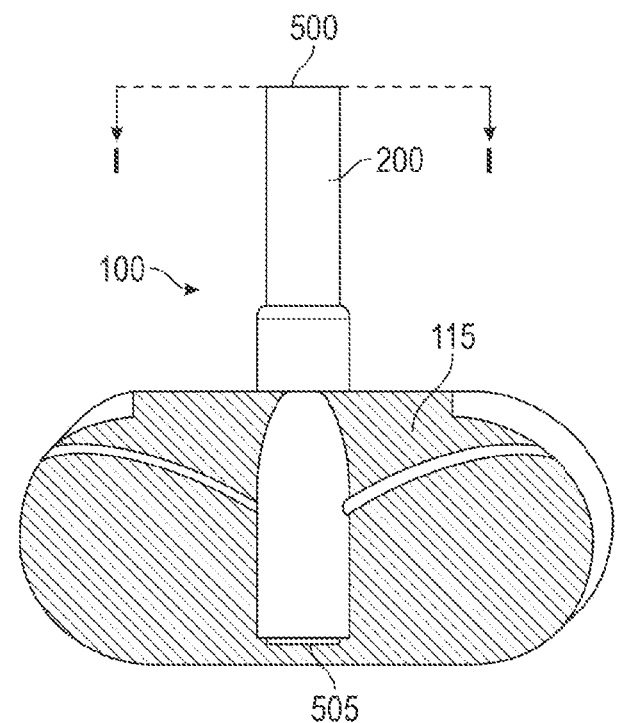
FIG. 5 depicts a front view of an exemplary TPMS sensor implementation.
Figure 6:
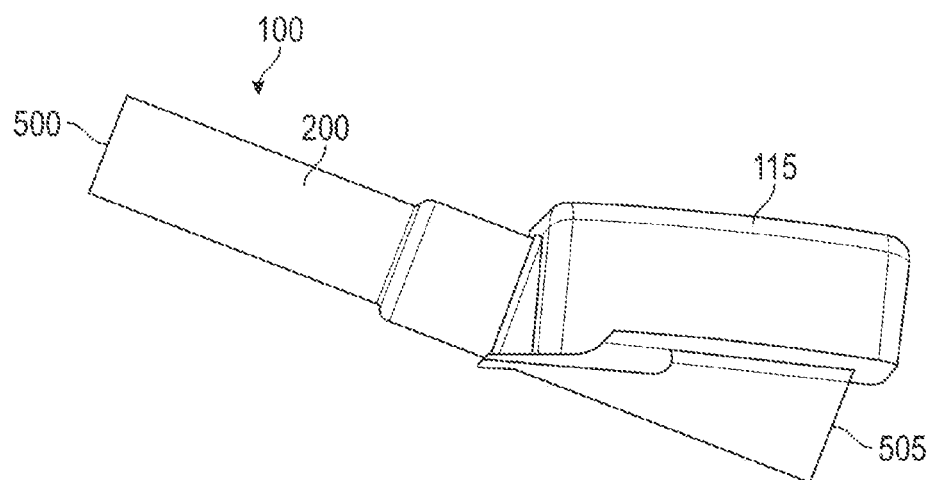
FIG. 6 depicts a side view of an exemplary TPMS sensor implementation.
Figure 7:
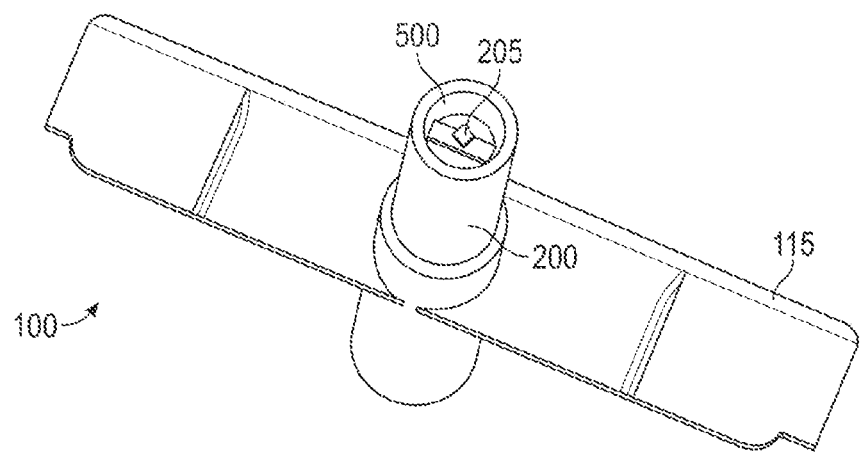
FIG. 7 depicts a top view of an exemplary TPMS sensor implementation.

In FIGS. 5-9, the depicted TPMS sensor assembly 100 implementation includes the valve stem 200 connected to the sensor body 115. The sensor body 115 houses a sensor as described herein at least with reference to FIGS. 1 and 2. The TPMS sensor assembly 100 may have a sensor body 115 that is hard connected to the valve stem 200. The hard-connected sensor body 115 may not be removable from the valve stem. The sensor body 115 may be removable from the valve stem 200 using one or more fasteners. In FIG. 5, the TPMS sensor assembly 100 includes the top outlet port 500 and the bottom outlet port 505. In FIG. 5, the valve stem core 205 is included within the valve stem 200. The valve stem core 205 is visible at least in FIG. 7. The TPMS sensor assembly 100 may use a nut 235 and/or optionally a washer 240 to fasten onto the outer tire rim 110 of the tire 105. The fastener size of the nut 235 may vary between 10-12 mm in a non-limiting example.

Figure 8:
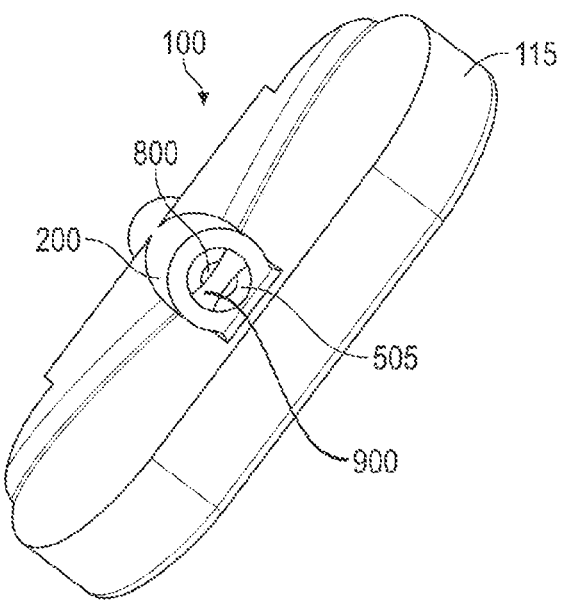
FIG. 8 depicts a bottom view of an exemplary TPMS sensor implementation.

FIG. 8 shows a bottom view of the exemplary TPMS sensor assembly 100. FIG. 8 illustrates there may be a bottom outlet port 505 that is part of the overall valve stem 200. In FIG. 8 the bottom outlet comprises the general interior opening 800. FIG. 9 is a cross-sectional view of a TPMS sensor assembly 100 implementation showing an exemplary interior of the TPMS sensor assembly 100. In a non-limiting example, the valve stem core 205 as shown in FIG. 9 is positioned within the valve stem 200 of the TPMS sensor assembly 100. Also integrated within the interior cavity of the valve stem 200 is an integrated battery 215. In a non-limiting example, this integrated battery 215 is tubular shaped. The term "tubular shaped" as used herein may refer to a battery that is a cylinder as shown at least in FIG. 9. In an illustrative example such a tubular shaped integrated battery 215 may advantageously extend through the interior cavity of the valve stem 200 and into the interior housing area of the sensor body 115. The integrated, tubular shaped battery 215 may power the sensor 230 also positioned within the sensor body 115. Further, there may be a bar such as bar 900, visible in both FIG. 8 and FIG. 9, positioned in the lower area 905 of the sensor body 115 that can facilitate the electrical connection and connect the integrated tubular shaped battery 215 to sensor 230 in the sensor body 115. There may be other electrical contacts and supports that also facilitate the electrical connection between the integrated battery 215 and the sensor 230. The bottom outlet port 505, as shown in FIG. 5 and FIG. 8, allows air flow through the general interior opening 800 cavity and around either side of the bar 900 while facilitating an electrical connection.

The battery 215 may be connected/integrated with the valve stem core 205 so that the removal of the battery 215 is made even easier by removing the valve stem core 205, such that removal and replacement is a one-step process. Advantageously, the user does not have to deflate the tire 105 and/or remove the vehicle tire 105 from a vehicle to change the integrated tubular battery 215, depicted at least in FIG. 9 for the TPMS sensor assembly 100 implementation shown in FIGS. 5-9. Rather, the user may, in a much quicker and simpler fashion, remove the air cap 120 from the valve stem assembly 200, whereby the air cap 120 may be pushed onto a top outlet port 500 or otherwise screwed on. Next, the user would remove the valve stem core 205 from the interior cavity of the valve stem 200. Next the user can reach in using one or more tools to pull out an expired or dead integrated battery 215. Next, the user may slide or push in a new integrated battery 215, replace or reinstall a new valve stem core 205, and reapply the air cap 120. As noted above, the battery 215 may be connected/integrated with the valve stem core 205 such that the removal and replacement of the valve stem core 205 and battery 215 is performed in one-step. The process for removing such a tubular shaped, integrated battery 215 is much simpler than the process for changing a battery on conventional, prior art TPMS sensors existing before the present disclosure, as discussed herein. Advantageously, it should be feasible for average consumers to change such a battery 215 without having to go to a mechanic.

Advantageously, a TPMS sensor assembly 100 implementation in accordance with the teaching of the present disclosure does not require a user to completely change the form and structure of the tire 105 and/or rim 110. Such a TPMS sensor assembly 100 implementation has an internal sensor 230 similar to direct TPMS systems that may communicate with the vehicle's ECM to indicate to a driver when a tire has low air pressure.

Advantageously, a TPMS sensor assembly 100 implementation in accordance with the teaching of the present disclosure integrates a battery 215 beneath the valve stem core 205 in a manner that is easier to extract and replace when needed.

Figure 10A:
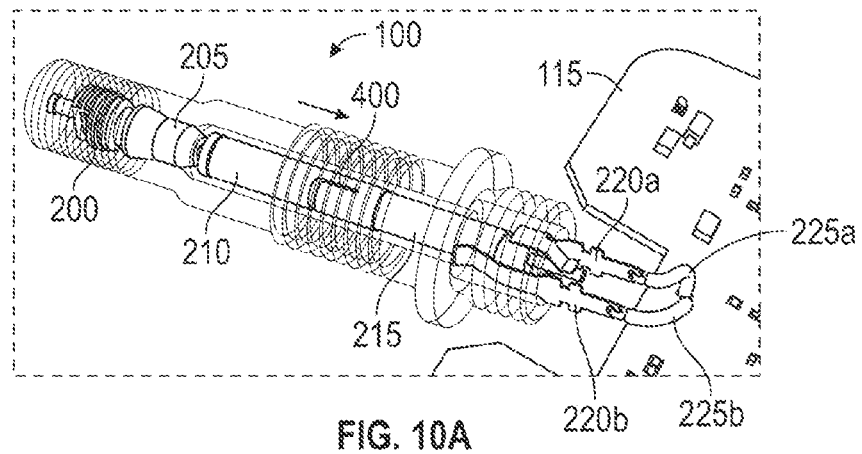
FIGS. 10A-10C together depict perspective cutaway views of an exemplary TPMS sensor implementation with an articulating valve stem core.
Figure 10B:
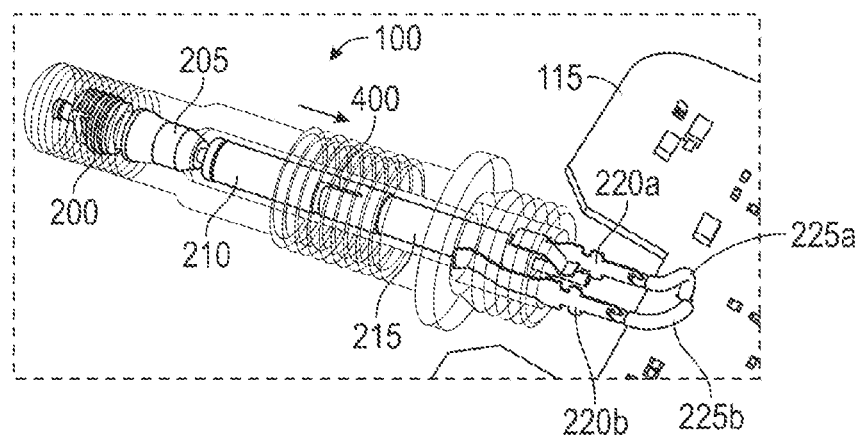
Figure 10C:
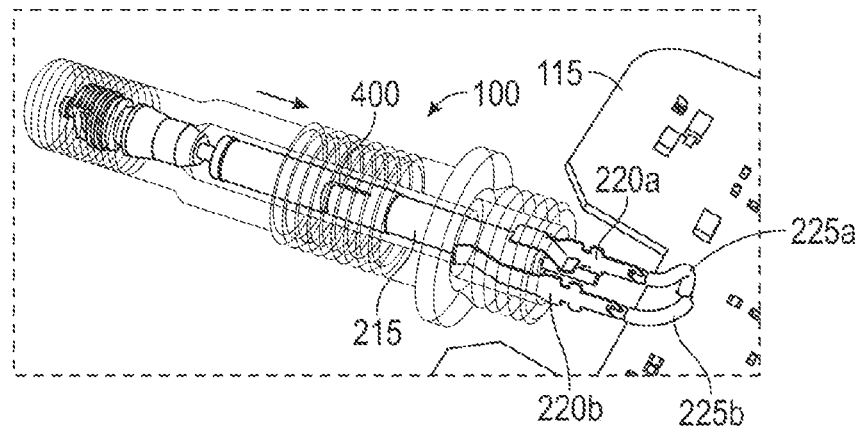

FIGS. 10A-10C together depict perspective cutaway views of an exemplary TPMS sensor implementation with an articulating valve stem core. The TPMS sensor assembly 100 implementation depicted by FIGS. 10A-10C includes at least the features described herein with reference to FIGS. 1-9. The valve stem core 205 may be permanently affixed to the battery 215. The battery 215 may articulate or slide along the longitudinal axis of the valve stem 200 to permit airflow through the valve stem 200. The airflow through the valve stem 200 may be airflow through the battery retaining clip 210. The battery retaining clip 210 may be accompanied by a secondary clip to hold the valve stem core 205 in the "open" position to facilitate airflow. In FIGS. 10A-10C the TPMS sensor assembly 100 includes the battery retaining clip 210 configured with the attachment slot 400. In FIGS. 10A-10C, the TPMS sensor assembly 100 valve stem core 205, the battery retaining clip 210 and the attachment slot 400 can be seen to articulate or slide in the direction of the arrow along the longitudinal axis of the valve stem 200 from FIG. A to FIG. B to FIG. C, permitting airflow through the valve stem 200.

Although features of various implementations have been described with reference to the Drawings, other implementations are possible within the scope of the present disclosure. In illustrative examples, various implementations in accordance with the teaching of the present disclosure may be configured with a larger custom battery. Some designs may include a much longer tubular battery that can still fit into the diameter of a valve stem. These longer batteries would need to be accommodated with a sensor body designed to facilitate the electrical connection in a different location. Such a design may redirect airflow in the sensor body. For example, airflow to the tire is achieved from an opening in the bottom of the valve stem. A "bridge" or bar at the base of the sensor body shows where an electrical connection from the battery to the sensor could be made. In practice, it is best to keep high pressure air away from the battery connections or battery electricals, and in view of this a sensor body designed to accommodate a larger battery may be configured to direct air to exit somewhere in the middle of the sensor body or valve stem. The battery size is only restricted by length up to about 4 inches, since this is what could realistically fit inside a wheel/tire assembly. Batteries may be 2-3 inches in length. The diameter of the battery should not exceed the diameter of the valve stem core. This will allow the novel design to be compatible with current standardized sizes.

In illustrative examples, various implementations in accordance with the teaching of the present disclosure may have tubular batteries permanently attached to the valve stem core. This allows technicians to replace the battery in one step when they remove the valve stem core. This also improves safety, as an un-affixed battery will be pushed out by the air in the tire once the valve stem core is removed. The battery and the valve stem core may be configured independently in an exemplary implementation. The technician would unscrew the valve stem core, and the air pressure in the tire would push the battery out. This introduces a possible safety concern, as the unsecured battery could projectile out of the tire if there is sufficient pressure. The battery may be non-permanently affixed to the valve stem core. The valve stem core may affix to the battery via an intermediary "clip" or retainer.

In illustrative examples, various implementations in accordance with the teaching of the present disclosure may have the valve stem adapted to work with various battery designs. For example, the valve stem may need to have a different interior cavity than existing standard valve stems. Once airflow reaches a certain point of the valve stem, any exit point can facilitate air to the tire. An increased valve stem cavity size may facilitate the battery attached to the end of the valve stem. The airflow travels out of the base valve stem, around the battery and electrical connections, through an exit in the sensor body and into the tire. Some implementations may have the electrical connections isolated in the sensor body, and the airflow will exit the valve stem before the sensor body. The airflow to the tire from the valve stem is not the same passageway where the sensor measures air pressure. An exemplary TPMS sensor may feature the pressure sensor mounted somewhere on the sensor body.

In illustrative examples, various implementations in accordance with the teaching of the present disclosure may have electrical contacts configured to connect the battery. For example, the electrical contacts on the sensor side may press down on the battery connection regardless of whether the valve stem core is in the open or closed position. Some electrical connection designs may feature two or more electrical "prongs" that reach out and facilitate both the positive and negative connections. The battery may be grounded to the valve stem. Some batteries may be designed with a long electrical "stem" at the base of the battery to facilitate articulation. Some existing batteries have a "stem" at the base that is long enough to connect electrically, but not long enough to articulate and maintain connection. Theoretically, a custom battery solution could have these features integrated.

Figure 12:
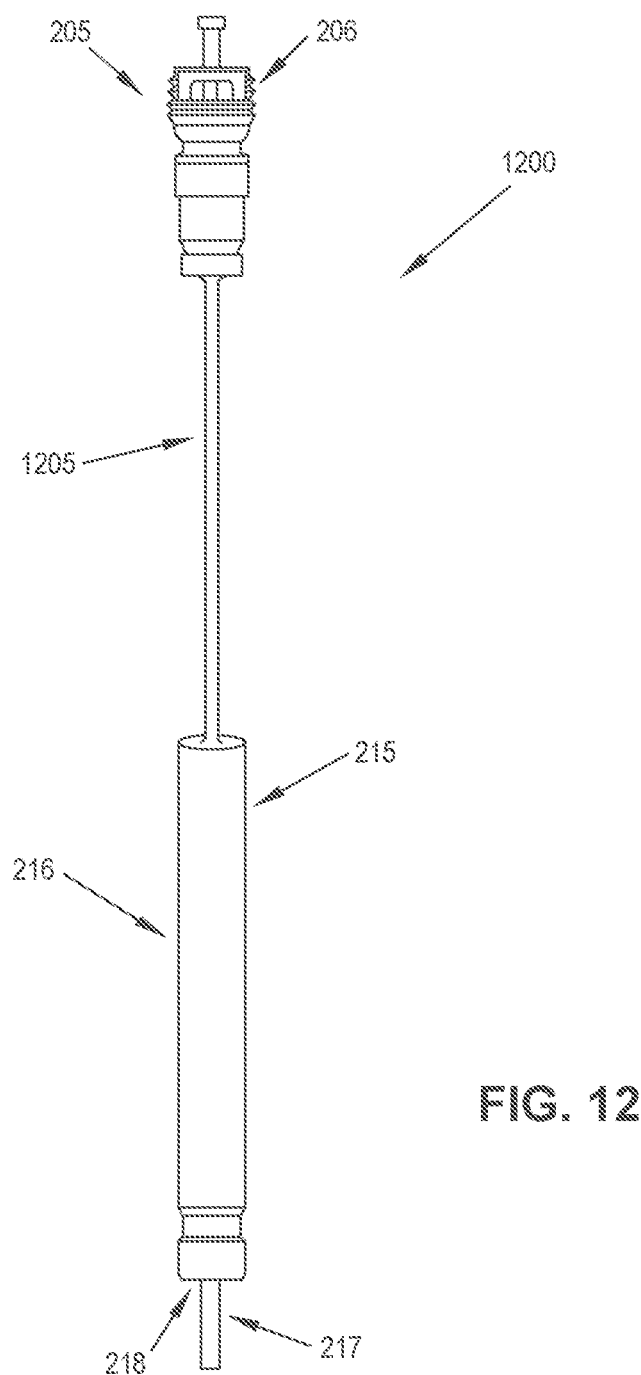
FIG. 12 depicts a perspective view of the valve stem insert component of the alternative, modular design.

FIG. 12 shows an alternative embodiment for the valve stem insert 1200. This embodiment has a valve stem core 205 attached to a metal pole 1205. The valve stem core 205 may have screw threads 206 for attachment to the valve stem 1300. The metal pole 1205 is attached to the battery 215. In some embodiments, the battery is a CR435 battery, sometimes called a fishing lure battery. Other batteries could also be used. The attachment of the pole 1205 to the battery 215 could be through welding, adhesives, clips, or other mechanical methods of attachment. The metal pole 1205 could be the pin from the valve stem core 205 or the metal pole 1205 could be attached to the valve stem core 205 through welding, adhesives, clips, or other mechanical methods of attachment.

Battery 215 may have a positive and a negative pole. In some embodiments, the positive pole 216 is the outer enclosure of the battery 215. In some embodiments, the negative pole 217 is a metal pole that extends from the bottom of the battery 215. An insulator 218 may be at the bottom of the battery 215 between positive pole 216 and negative pole 217.

FIGS. 13 and 14A-G show an alternate, modular embodiment. In this embodiment, the valve stem 1300 is separated from the sensor assembly 1400 as separate modules that are mechanically connected together. In this embodiment, the mechanical connection is through screw threads, with the sensor screw threads 1320 screwing into the sensor-stem interface 1415. In other embodiments, the sensor screw threads 1320 could be replaced with a clip mechanism, a nail, a staple, a screw, a nut and bolt, a pin, a cotter pin, rivets, clevis pins, dowel pins, integral fasteners, or similar.

The valve stem 1300 could be a hollow cylinder with three sets of screw threads 1305,1310,1320 and a stem base 1325. The valve stem 1300 has air cap screw threads 1305 at the top, for receiving air cap 120. The air cap screw threads 1305 could have a M8×1.0 screw threads in one embodiment. The tire nut screw threads 1310 could be in the middle of the valve stem 1300, with a larger diameter than the air cap screw threads 1305 in some embodiments. For example, the tire nut screw threads 1310 could have M10× 1.25 screw threads. The tire nut screw threads 1310 are intended to receive the tire nut 405. Below the tire nut screw threads 1310 is the stem base 1325. The stem base 1325 could have one or more air ports 1315 to allow air out of the valve stem 1300 and into the tire. The at least one air port 1315 could be 2 mm in diameter. The stem base 1325 could be 16 mm in diameter, and could have two flat edges 14 mm edge to edge. Below the stem base 1325 are sensor screw threads 1320 for receiving the sensor assembly 1400. The sensor screw threads 1320 could have M12×1.25 screw threads. The valve stem 1300 could have additional screw threads inside the top of the valve stem 1300 for holding the valve stem insert 1200 inside the hollow core of the valve stem 1300 cylinder.

Figure 14A:
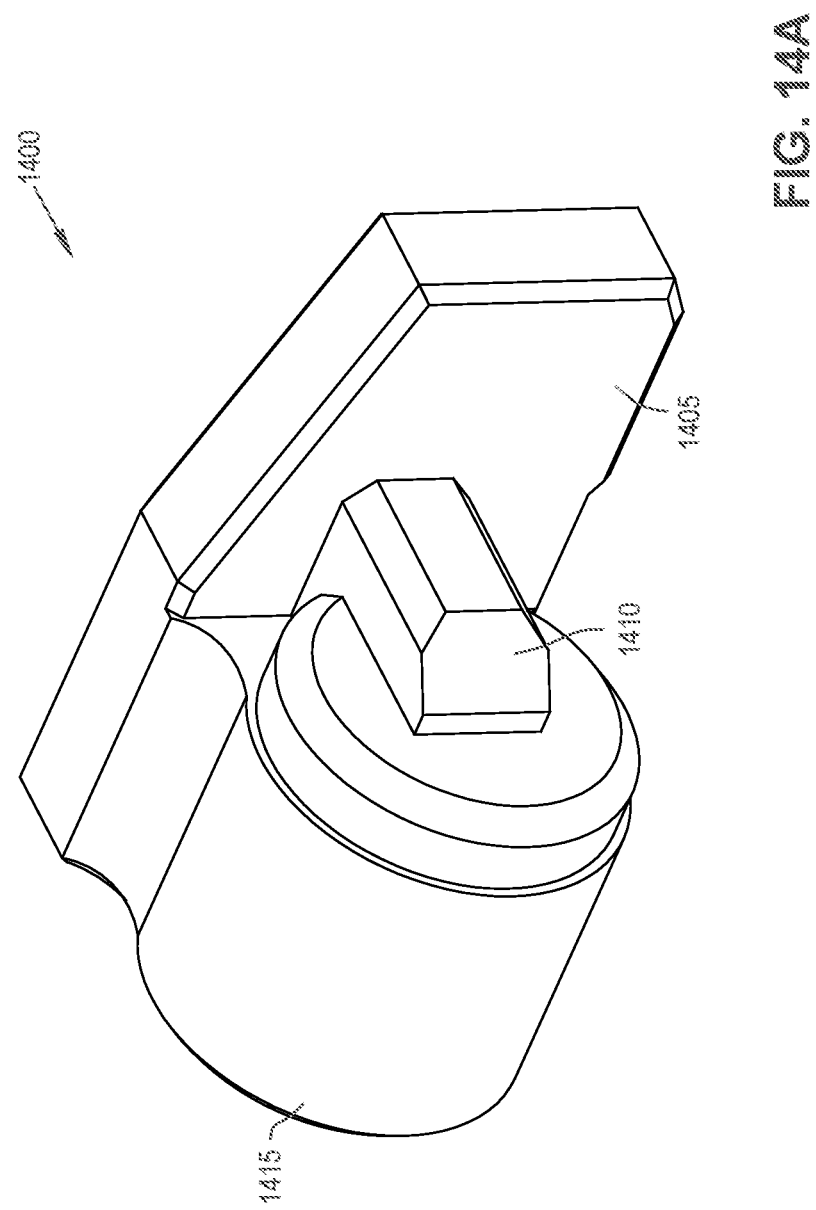
FIG. 14A depicts a perspective view of the sensor attachment component of the alternative, modular design.

FIG. 14A shows an embodiment of the sensor assembly 1400. The sensor assembly 1400 has a sensor-stem interface 1415, a wire run 1410, and a PC board enclosure 1405. The sensor assembly 1400 could be made of rubber, wood, cardboard, fabric, ceramic, aluminum, steel, stainless steel, iron, bronze, brass, acrylonitrile butadiene styrene (ABS), polyethylene terephthalate (PET or PETE), high-density polyethylene (HDPE), polyvinyl chloride (PVC or Vinyl), low-density polyethylene (LDPE), polypropylene (PP), polystyrene (PS or Styrofoam), bisphenol, methyl methacrylate (PMMA), polybutylene terephthalate (PBT), and polyether ether ketone (PEEK), polyacetylene, high impact polystyrene (HIPS), polycarbonate (PC), urea-formaldehyde (UF), silicone, aramids, polyetherimide (PEI), polyimide, polysulfone, polytetrafluoroethylene (PTFE), polyamide-imide (PAI), or similar materials. The parts of the sensor assembly 1400 could be the same or different materials. Mechanically, the sensor-stem interface 1415 is connected to the PC board enclosure 1405. In some embodiments, the PC board enclosure 1405, wire run 1410, and the sensor-stem interface 1415 are molded together in a single injection molded piece. In some embodiments, the injection molding is done with over-molding or two-stage injection molding with the PC board 1440 inside. Additive technologies, such as 3-D printing and similar, is another process that could be used to create the sensor assembly 1400. The sensor assembly 1400 could also be created, either fully or partially, by subtractive technologies such as milling, lathes, or other similar technologies. In some embodiments, the sensor assembly 1400 is created as a single device. In other embodiments, the PC board enclosure 1405, the wire run 1410, and the sensor-stem interface 1415 are created separately and these components may be attached together using various techniques. For example these components may be attached together using a chemical with a rubber adhesive, pitch, two-sided tape, water-based adhesives, solvent-based adhesives, reactive adhesives (polyurethane, acrylic, cyanoacrylate, polyimide, silicone, etc.), hot melt adhesives (hot glue, etc.), thermosetting adhesives (resin and hardener, etc.), pressure-sensitive adhesives, contact adhesives, epoxy adhesives, white glue (polyvinyl acetate), and similar. Alternatively, the sensor assembly 1400 could be mechanically attached with a clip mechanism, a nail, a staple, a screw, a nut and bolt, a pin, a cotter pin, rivets, clevis pins, dowel pins, integral fasteners, friction, heat fused, snapped together, or attached with other similar methods.

The wire run 1410 encloses the wires that run from the sensor-stem interface 1415 to the PC board enclosure 1405. These wires deliver power from the battery 215 to the PC board 1440 in the PC board enclosure 1405. The wires could be aluminum wires, steel wires, copper wires, or any other wire structure, with or without insulation. In another embodiment, the wires could be PC board traces, copper (or aluminum or steel) connectors, or other method of transmitting electricity. In one embodiment, a PC board is in the wire run 1410. One of the wires connects to the negative contact 1425 and another wire connects to the positive contact 1430. When the valve stem 1300 and the valve stem insert 1200 are inserted into the sensor assembly 1400, the negative pole 217 (see FIG. 12) makes contact with the negative contact 1425 (see FIG. 14E) and completes the negative circuit from the battery 215 to the PC board 1440. When the valve stem 1300 and the valve stem insert 1200 are inserted into the sensor assembly 1400, the positive pole 216 makes contact with the positive contact 1430 (see FIG. 14G), and the power from the battery is transmitted through the wires to power the PC board 1440.

The PC board enclosure 1405 holds a PC board 1440 or a custom chip that performs the sensing and communications function of the TPMS sensor assembly. The PC board 1440 or custom chip may be calibrated and configured to detect a level of air pressure for each tire 105. The PC board 1440 may be configured to communicate information about air pressure, temperature, location, and battery charge to a central monitor configured in the vehicle. The communication could be any wireless protocol, such as Bluetooth, Near Field Communication (NFC), wireless Local Interconnect Network (LIN), wireless CAN bus, IEEE 802.11, cellular (3G, 4G, 5G, etc), or custom protocols. In an illustrative example, the central monitor may be configured in the vehicle's Engine Control Module (ECM) or On-Board Diagnostics (OBD) unit. The vehicle's central monitor may indicate to the driver if low tire pressure has been detected in any tire 105 of the vehicle. The vehicle's central monitor may illuminate a TPMS warning light or indicate on a dashboard notification when one or more tire 105 are significantly underinflated (for example, 25% of vehicles recommended air pressure or 20 psi, whichever is greater).

The PC board 1440 may have a pressure sensor 1420 (see FIG. 14C), an analog-to-digital converter to convert the pressure sensor signal to digital data, a microcontroller to process the data, a radio frequency transceiver, and other components.

In some embodiments, the sensor assembly 1400 could be a simple sensor-stem interface 1415 with the PC board 1440 or custom chip located directly below the sensor-stem interface 1415, without needing the wire run 1410 and the sensor-stem interface 1415.

Figure 14B:
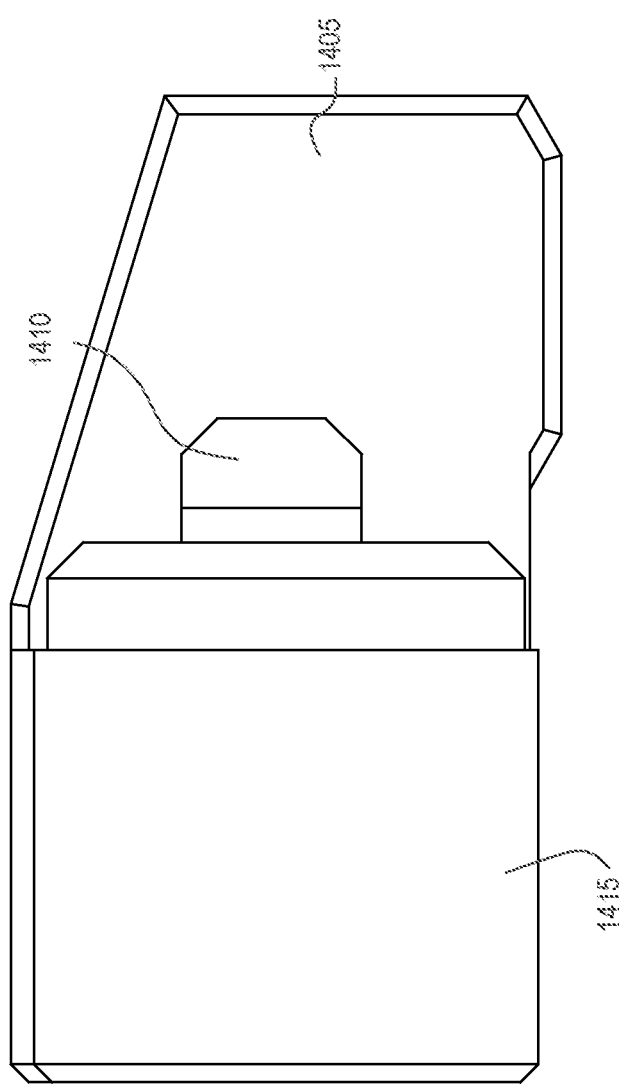
FIG. 14B depicts a front view of the sensor attachment component of the alternative, modular design.

FIG. 14B is a front view of the sensor assembly 1400, showing the location of the sensor-stem interface 1415, the wire run 1410, and the PC board enclosure 1405 in one embodiment.

FIG. 14C is a back view of the sensor assembly 1400 in one embodiment. The PC board enclosure 1405 is visible, with the PC board 1440 and the pressure sensor 1420 showing through. The pressure sensor 1420 may need to protrude through the back wall of the PC board enclosure 1405 so that the pressure sensor 1420 can detect the air pressure in the tire 105.

Figure 14D:
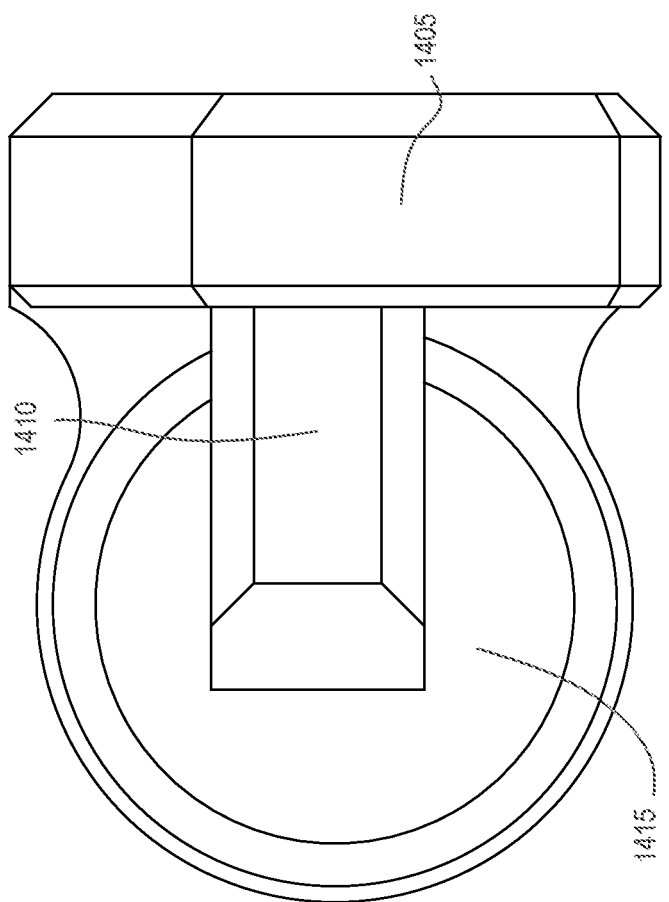
FIG. 14D depicts a right view of the sensor attachment component of the alternative, modular design.

FIG. 14D shows the right-side view of the sensor assembly 1400, showing the PC board enclosure 1405, the wire run 1410, and the sensor-stem interface 1415 in one embodiment.

FIG. 14E is a left-side view of the sensor assembly 1400. The PC board enclosure 1405 is visible on one side, and the sensor-stem interface 1415 is seen on the other side. The sensor-stem interface 1415 is a cylinder with an open center. The walls of the sensor-stem interface 1415 could have screw threads 1435 to accept the sensor screw threads 1320 of the valve stem 1300. When the valve stem insert 1200 is inserted in the valve stem 1300, and screwed into the sensor assembly 1400, the positive contact 1430 makes a pressure connection to the positive pole 216 of the battery 215, providing power to the sensor assembly 1400. The negative pole 217 goes into a hole with a negative contact 1425 at the bottom of the sensor-stem interface 1415, completing the circuit with the battery 215 to power the PC board 1440. Negative contact 1425 and positive contact 1430 could be copper contacts (short narrow strips of copper) that press against the battery 215. In other embodiments, negative contact 1425 and positive contact 1430 could be aluminum, gold, silver, steel, or other conductive material. In another embodiment, the PC board could have the negative contact 1425 and the positive contact 1430 mounted to the PC board, and the PC board could be inserted into the bottom of the sensor-stem interface 1415.

Figure 14G:
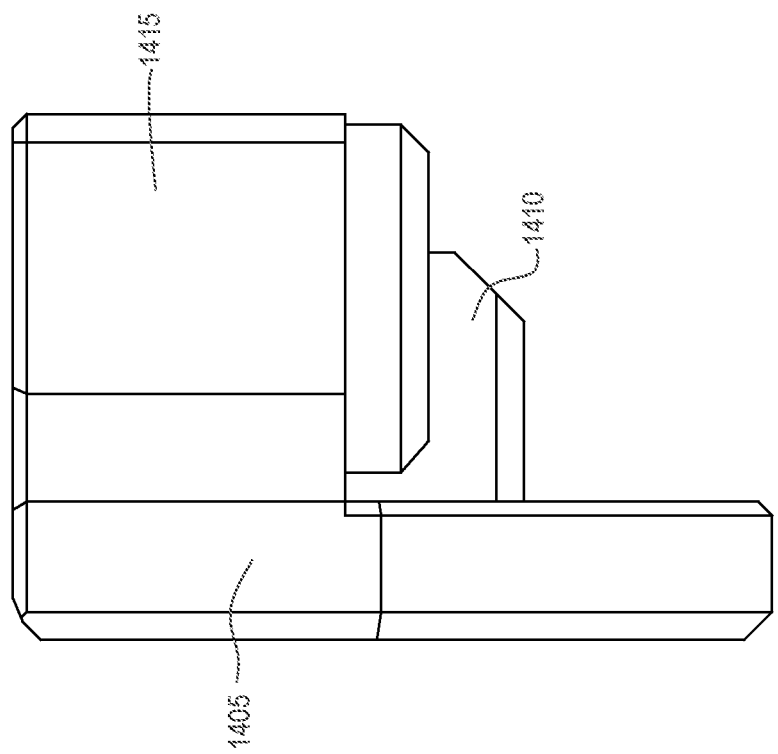
FIG. 14G depicts a bottom view of the sensor attachment component of the alternative, modular design.

FIG. 14F and FIG. 14G are top and bottom views of the sensor assembly 1400 showing the PC board enclosure 1405, the wire run 1410, and the sensor-stem interface 1415.

Figure 13:
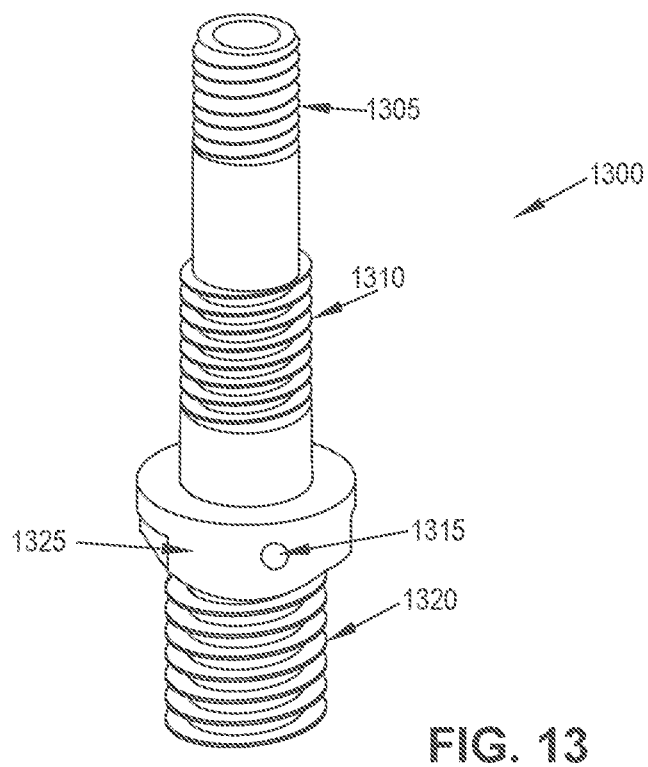
FIG. 13 depicts a perspective view of the valve stem component of the alternative, modular design.
Figure 15:
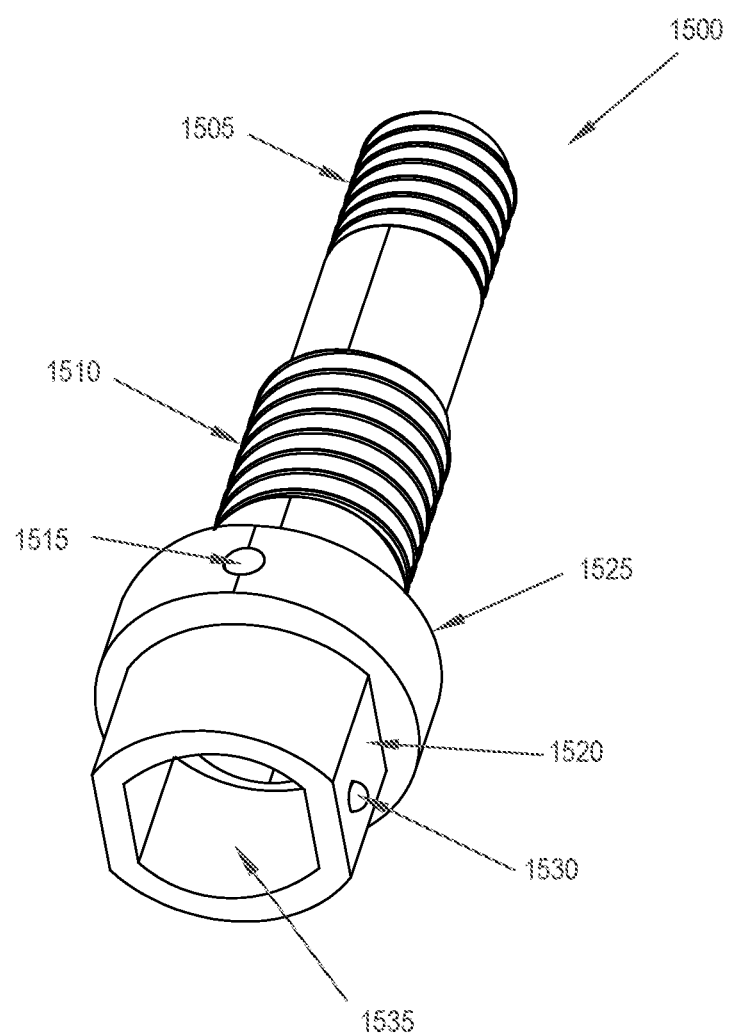
FIG. 15 depicts a perspective view of an alternative valve stem component of the alternative, modular design.

FIG. 15 is an alternative embodiment of the valve stem 1300 shown in FIG. 13. In this embodiment, the valve stem 1500 is separated from the sensor assembly 1400 as separate modules that are mechanically connected together. In this embodiment, the mechanical connection is through a snap-in clip mechanism, similar to a socket and socket wrench attachment mechanism. When the attachment block 1520 is inserted into a compatible receiving hole in the sensor assembly 1400 (not shown in the drawings, but in the same location as sensor-stem interface 1415 without the threads 1435 and shaped to receive the attachment block 1530). The attachment block 1520 could have a spring-loaded sphere 1530 installed in one or more of the edges. The sensor-stem interface 1415 of the sensor assembly 1400 could have a divot for receiving the spring-loaded sphere 1530, holding the sensor assembly 1400 and the valve stem 1500 together unless force is used to compress the spring allowing the spring-loaded sphere 1530 to exit the divot and the valve stem 1500 to be removed.

The valve stem 1500 could be a hollow cylinder with two sets of screw threads 1505,1510, an attachment block 1520, and a stem base 1325. The valve stem 1500 has air cap screw threads 1505 at the top, for receiving air cap 120. The air cap screw threads 1505 could have a M8×1.0 screw threads in one embodiment. The tire nut screw threads 1510 could be in the middle of the valve stem 1500, with a larger diameter than the air cap screw threads 1505 in some embodiments. For example, the tire nut screw threads 1510 could have M10×1.25 screw threads. The tire nut screw threads 1510 are intended to receive the tire nut 405. Below the tire nut screw threads 1510 is the stem base 1525. The stem base 1525 could have one or more air ports 1515 to allow air out of the valve stem 1500 and into the tire. The at least one air port 1515 could be 2 mm in diameter. The stem base 1525 could be a cylinder 16 mm in diameter (alternatively, the stem base 1525 could have two flat edges 14 mm edge to edge). Below the stem base 1525 is the attachment block 1520. This attachment block 1520 could have a cylindrical shape 14 mm across with two flat sides 12 mm edge to edge. One or more of the flat edges could have a spring-loaded sphere 1530 in the middle of the flat edge. The valve stem 1300 could have additional screw threads inside the top of the valve stem 1500 for holding the valve stem insert 1200 inside the hollow core 1535 of the valve stem 1500 cylinder.

In the Summary above, in this Detailed Description, and the Claims below, the content of each of the applications incorporated by reference herein and in the accompanying drawings, reference is made to features of various implementations of the invention. It is to be understood that the disclosure of implementations of the invention in this specification should be interpreted as including all possible combinations of such features. For example, where a particular feature is disclosed in the context of a particular implementation of the invention, or a particular claim, that feature can also be used—to the extent possible—in combination with and/or in the context of other implementations of the invention, and in the invention generally.

In the present disclosure, various features may be described as being optional, for example, through the use of the verb "may;" or, through the use of phrases such as but not limited to: "in some implementations," "in some designs," "in various implementations," "in various designs," "in an illustrative example," or "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. The respective implementation features, even those disclosed solely in combination with other implementation features, may be combined in any configuration excepting those readily apparent to the person skilled in the art as nonsensical. As the following claims may reflect, a point of novelty may lie in a combination of fewer than all features of any single foregoing disclosed implementation. This disclosure is intended to be interpreted as including all permutations of the independent claims with their dependent claims.

In sum, the present disclosure teaches tire pressure monitoring. More specifically, the invention relates to configuring a TPMS sensor with an externally replaceable battery. The valve stem facilitates the battery replacement with a valve stem core designed to removably secure a battery within the valve stem and a sensor configured with an electrical connection designed to connect the sensor to power from the battery. The valve stem may have an interior cavity configured to retain the valve stem core. The battery may be at least partially retained within the valve stem. The valve stem core may be coupled with a battery retaining clip configured to removably secure a battery within the valve stem. The battery may be at least partially retained within the battery retaining clip. The sensor may be configured in a sensor body connected to an end of the valve stem distal from the valve stem core. The electrical connection may comprise a spring-loaded terminal configured to connect or disconnect the sensor and battery as the battery is inserted or removed from the valve stem through a valve stem end proximal to the valve stem core, permitting battery replacement without removing or deflating a tire configured with the sensor. Replacing a battery in a TPMS sensor installed in a wheel on a vehicle may comprise removing the valve stem core from the interior cavity of the valve stem, pulling the battery out from within the valve stem, pushing another battery into the valve stem, and replacing the valve stem core in the valve stem, without deflating the tire or removing a wheel with the tire from the vehicle.

Various implementations may achieve one or more technical effects. For example, some implementations may reduce a user's effort replacing a battery in a TPMS sensor. Such reduced battery replacement effort may be a result of a TPMS sensor assembly designed with an integrated battery implemented within a valve stem core. The integrated battery may be removed and replaced through the valve stem while the TPMS sensor assembly remains mounted to a tire rim on a vehicle without deflating the tire, reducing the user's effort replacing the TPMS sensor batteries. In some implementations, a user's cost to maintain their tire pressure monitoring capability may be reduced. This facilitation may be a result of a TPMS sensor assembly with a valve stem configured to retain a battery within the valve stem and permit a user to replace their TPMS sensor battery by themselves, without specialized tools or the added expense of a professional mechanic. In some implementations, the user's safety may be improved. For example, a user who is enabled by the present disclosure to replace their TPMS sensor batteries by themselves may be more likely to promptly replace their TPMS sensor batteries and maintain their tire pressure monitoring capability.

In an illustrative example, prior to the teaching of the present disclosure manufacturers may have viewed the market for TPMS sensors as a cost rather than a form of revenue. The prior market suffered from heavy aftermarket penetration. This is largely due to TPMS being required by law in all new vehicles sold in any major worldwide market. TPMS suppliers and the aftermarket benefited considerably more from TPMS than manufacturers did. The benefits of an externally replaceable battery are not just the convenience and time savings, but the effective erasure of aftermarket penetration long term. Consumers previously chose aftermarket sensors for affordability. With externally replaceable batteries in accordance with the teaching of the present disclosure, the most affordable solution may be to replace the battery instead of opting in to a new (aftermarket) sensor. OEMs will want to implement this technology, and their suppliers will be more than happy to sell it to them. In an illustrative example, suppliers will be able to adapt their proprietary sensor technology to the new externally replaceable battery system. Further efforts to reduce costs can be found in the modular aspect of the inventions. Some embodiments separate the valve stem from the sensor, allowing the valve stem to be mass produced. Other aspects of the modular design create a rugged implementation that can handle the rotational speed and shock forces that a tire incurs as a vehicle is driven.

Tire pressure monitoring may be implemented as an apparatus. The apparatus may comprise a sensor system. The sensor system may be a tire pressure sensor system. The tire pressure sensor system may comprise a sensor circuit. The sensor circuit may be configured in a circuit assembly. The circuit assembly may comprise electronic components. The circuit assembly may be implemented in a circuit board or printed wiring board. The sensor circuit may comprise an air pressure sensor. The tire pressure sensor system may comprise a valve stem. The tire pressure sensor system may comprise a valve stem core retained by the valve stem. The valve stem may be in fluid communication with the sensor circuit and the air pressure sensor. The valve stem core may be in fluid communication with an atmosphere through the valve stem. The tire pressure sensor system may comprise a battery. The battery may be at least partially retained within the valve stem. The battery may be cylindrical. The battery may be shaped to fit within a tubular structure. The battery may be an elongated structure having two ends comprising a first end distal from a second end. The battery may have a positive electrical contact. The battery may have a negative electrical contact. The battery positive and negative electrical contacts may both be disposed at a single end of the battery. The battery positive electrical contact may be disposed at one end of the battery opposite from the battery negative electrical contact disposed at another end of the battery. The valve stem core may be configured to removably secure the battery within the valve stem. The valve stem core may be configured with a retaining clip designed to removably secure the battery within the valve stem between the valve stem core and the sensor circuit. The battery may be configured to electrically connect to the sensor circuit. The battery may be adapted to be removably retained within the valve stem. The battery may be adapted to be removably retained within the valve stem based on configuring a battery sized to fit within the valve stem to electrically connect to the sensor circuit. As used herein the terms contact and connection are considered interchangeable and synonymous unless usage in a particular instance or context indicates otherwise.

Tire pressure monitoring may be implemented as a method. The method may comprise using a tire pressure sensor system. Using the tire pressure sensor system may comprise installing the tire pressure sensor system in a wheel. Using the tire pressure sensor system may comprise removing and replacing a battery in the tire pressure sensor system. Replacing the battery in the tire pressure sensor system may comprise replacing the battery without removing the tire pressure sensor system from a wheel, wherein the tire pressure sensor system is installed in the wheel. Replacing the battery in the tire pressure sensor system may comprise replacing the battery without removing a wheel from a vehicle, wherein the tire pressure sensor system is installed in the wheel on the vehicle. Using the tire pressure sensor system may comprise removing the tire pressure sensor system from a wheel. The method may comprise making a tire pressure sensor system. Making the tire pressure sensor system may comprise configuring a valve stem core to removably secure a battery at least partially retained within the valve stem. Configuring the valve stem core to removably secure a battery may comprise configuring a retaining clip designed to removably secure the battery within the valve stem between the valve stem core and the sensor circuit. The method may comprise configuring the battery to electrically connect to the sensor circuit. A plurality of electrical contacts may electrically connect the battery to the sensor circuit. Making the tire pressure sensor system may comprise adapting a battery to be removably retained within the valve stem. Adapting the battery to be removably retained within the valve stem may comprise making a battery sized to fit within the valve stem and configuring the battery to electrically connect to the sensor circuit.

An apparatus implementation may comprise: a valve stem 200 configured with a valve stem core 205 disposed at least partially within the valve stem 200, wherein the valve stem 200 is configured to removably secure a battery 215 disposed at least partially within the valve stem 200 and having a positive electrical connection 220a and a negative electrical connection 220b disposed at a single end of the battery 215; and a sensor 230 configured with positive electrical wiring 225a and negative electrical wiring 225b comprising respective spring-loaded terminals configured to electrically connect or disconnect the sensor 230 and the battery 215.

The sensor 230 may further comprise an air pressure sensor.

The valve stem 200 may be configured to be fluidly coupled with the sensor 230.

The sensor 230 may be disposed within a tire 105.

The valve stem 200 may be configured to fluidly couple the tire 105 with an atmosphere.

The valve stem 200 may be configured to be fluidly coupled with an atmosphere.

The battery 215 may be substantially cylindrical in shape.

The battery 215 may be shaped to fit at least partially within a tubular structure.

The battery 215 may comprise an elongated structure having two battery 215 ends comprising a first end distal from a second end.

The battery 215 may comprise a material selected from the group consisting of lithium ion and nickel metal hydride.

The battery 215 may have a rated voltage in a range of 1V to 6 V, +/−10%, in some embodiments. In other embodiments, the battery could supply any amount of voltage without deviating from the inventions herein.

The battery 215 may further comprise a positive electrical connection.

The battery 215 may further comprise a negative electrical connection.

The battery 215 may further comprise at least two electrical connections both disposed at one end of the battery 215.

The spring-loaded terminals may be long enough to maintain electrical connection between the battery 215 and the sensor 230 and permit airflow through the valve stem 200 when the battery 215 articulates along the valve stem 200 longitudinal axis.

The battery 215 may further comprise at least one electrical connection configured at a central core of the battery 215, wherein the central core of the battery protrudes from one end of the battery 215.

The battery 215 may further comprise at least one electrical connection configured at an outer surface of the battery 215.

The battery 215 may further comprise at least two electrical connections, wherein one of the at least two electrical connections is disposed at one battery 215 end distal and opposite from another of the at least two electrical connections disposed at another battery 215 end.

The apparatus may further comprise the battery 215 disposed at least partially within the valve stem 200.

The apparatus may further comprise the battery 215 disposed at least partially within a sensor body 115 configured to retain the sensor 230.

The apparatus may further comprise a battery retaining clip 210 configured to removably secure the battery 215 within the valve stem 200.

The battery retaining clip 210 may be substantially tubular with an opening configured to accept an end of the battery 215 inserted into the battery retaining clip 210.

The battery retaining clip 210 may comprise an attachment slot 400.

The attachment slot 400 may be a snap-in attachment point.

The valve stem core 205 may be configured with a bead or prong designed to snap-in to the attachment slot 400.

An inner surface of the valve stem 200 may be configured with a bead or prong designed to snap-in to the attachment slot 400.

The attachment slot 400 may comprise at least one substantially right-angle bend.

The apparatus may further comprise the battery retaining clip 210 coupled with the valve stem core 205.

The apparatus may further comprise the battery 215 is electrically connected to the sensor 230.

The apparatus may be installed in at least one tire rim 110 installed on a vehicle.

The vehicle may further comprise a plurality of tire rims 110.

A method implementation may comprise: configuring a valve stem (200) with a valve stem core (205) disposed at least partially within the valve stem (200), wherein the valve stem (200) is configured to removably secure a battery (215) disposed at least partially within the valve stem (200) and having a positive electrical connection (220a) and a negative electrical connection (220b) disposed at a single end of the battery (215); and configuring a sensor (230) with positive electrical wiring (225a) and negative electrical wiring (225b) comprising respective spring-loaded terminals configured to electrically connect or disconnect the sensor (230) and the battery (215).

The method may further comprise configuring the sensor (230) with an air pressure sensor disposed within a tire (105).

The method may further comprise configuring the valve stem (200) to be fluidly coupled with the sensor (230).

The method may further comprise configuring the valve stem (200) to fluidly couple the tire (105) with an atmosphere and configuring the valve stem (200) to be fluidly coupled with the atmosphere.

The method may further comprise configuring the battery (215) to be shaped to fit at least partially within an elongated tubular structure having two battery (215) ends comprising a first end distal from a second end.

The battery (215) may be shaped to fit at least partially within an elongated tubular structure having two battery (215) ends comprising a first end distal from a second end.

The method may further comprise using a battery (215) having a rated voltage in a range of 1 V to 6 V, +/−10%.

The battery (215) may have a rated voltage in a range of 1 V to 6 V, +/−10%.

The method may further comprise configuring the spring-loaded terminals to be long enough to maintain electrical connection between the battery (215) and the sensor (230) and permit airflow through the valve stem (200) when the battery (215) articulates along the valve stem (200) longitudinal axis.

The method may further comprise configuring the battery (215) with at least one electrical connection configured at a central core of the battery (215), wherein the central core of the battery protrudes from one end of the battery (215).

The method may further comprise configuring the battery (215) with at least one electrical connection configured at an outer surface of the battery (215).

The method may further comprise configuring the battery (215) with at least two electrical connections, wherein one of the at least two electrical connections is disposed at one battery (215) end distal and opposite from another of the at least two electrical connections disposed at another battery (215) end.

The method may further comprise positioning the battery (215) at least partially within a sensor body (115) configured to retain the sensor (230).

The method may further comprise installing a battery retaining clip (210) configured to removably secure the battery (215) within the valve stem (200).

The method may further comprise electrically connecting the battery (215) to the sensor (230).

The method may further comprise installing the valve stem (200) in at least one tire rim (110) installed on a vehicle.

The method may further comprise installing the valve stem (200) in at least one tire rim (110) installed on a vehicle, wherein the vehicle is configured with a plurality of tire rims (110).

An apparatus kit implementation may comprise: a valve stem (200) configured to removably retain a valve stem core (205) disposed at least partially within the valve stem (200), wherein the valve stem (200) is configured to removably secure a battery (215) disposed at least partially within the valve stem (200) and have a positive electrical connection (220*a*) and a negative electrical connection (220*b*) disposed at a single end of the battery (215); and a sensor (230) configured with positive electrical wiring (225*a*) and negative electrical wiring (225*b*) comprising respective spring-loaded terminals configured to electrically connect or disconnect the sensor (230) and the battery (215).

The apparatus kit sensor (230) may further comprise an air pressure sensor.

The apparatus kit may further comprise spring-loaded terminals long enough to maintain electrical connection between the battery (215) and the sensor (230) and permit airflow through the valve stem (200) when the battery (215) articulates along the valve stem (200) longitudinal axis.

The apparatus kit may further comprise at least one tire rim (110).

The apparatus kit may further comprise the valve stem (200) installed in the at least one tire rim (110).

A method in accordance with the present disclosure to make a pressure sensor may comprise: configuring a valve stem with a valve stem core coupled with a battery retaining clip configured to removably secure a battery within the valve stem; and configuring a sensor with an electrical connection adapted to connect the sensor to power from the battery.

A method in accordance with the present disclosure to replace a battery in a pressure sensor installed in a wheel with a tire on a vehicle may comprise: removing a valve stem core from an interior cavity of a valve stem; pulling a battery out from within the valve stem; pushing another battery into the valve stem; and replacing the valve stem core in the valve stem, without deflating the tire or removing the wheel from the vehicle.

An implementation in accordance with the present disclosure may provide an improved tire pressure monitoring system (TPMS) sensor having an integrated battery that may be easily removed through the valve stem when the battery needs to be replaced, to avoid the expense and time required to visit a specialized mechanic's shop or dealership to replace a battery on the TPMS sensor.

An implementation in accordance with the present disclosure may provide an improved TPMS sensor system that can work with existing systems and may be mounted on the rim of each tire of a vehicle, using a battery that is integrated into the valve stem core to permit battery removal and replacement without removing or deflating a tire.

A TPMS sensor implementation may comprise: a valve stem having an interior cavity; a valve stem core positioned within the interior cavity of the valve stem; a sensor body, wherein the valve stem is coupled to the sensor body; and a battery, wherein the battery is positioned beneath the valve stem core inside the interior cavity of the valve stem and extends into the sensor body to power a sensor integrated into the sensor body.

The battery may be tubular shaped.

The sensor body may be mountable to a tire rim of a tire for a vehicle.

The tire does not have to be removed from the vehicle or detached from the tire rim to remove the battery from the TPMS sensor.

An apparatus may comprise a TPMS sensor with the battery implemented in the valve stem core.

Removing the battery does not require removing the wheel that the TPMS sensor is connected to/monitoring.

A pressure sensor apparatus in accordance with the present disclosure may comprise: a valve stem configured with a valve stem core coupled with a battery retaining clip configured to removably secure a battery within the valve stem; and a sensor configured with an electrical connection adapted to connect the sensor to power from the battery.

An implementation in accordance with the present disclosure may comprise a TPMS sensor assembly that can be mounted to a rim of a tire of a vehicle. Further, in a non-limiting implementation, the TPMS sensor as described herein may include an integrated battery that can be implemented into the valve stem core. Advantageously, the process of replacing a battery integrated in the valve stem core, as described herein, in a TPMS sensor can be completed in a much quicker and easier manner than conventional TPMS sensors that require a specialized mechanic. In some implementations, the replacement of the integrated battery on a TPMS sensor can be performed with an inflated tire still on the vehicle, which is a much more appealing and cost-effective alternative for consumers.

In some aspects, the techniques described herein relate to a pressure monitoring system including: a valve stem (1300, 1500), the valve stem (1300,1500) being cylindrical in shape with a hollow center and screw threads on an outer wall, the valve stem (1300,1500) including at least one air port (1315,1515) through the outer wall; a valve stem insert (1200), the valve stem insert (1200) removably inserted into the hollow center of the valve stem (1300,1500), the valve stem insert (1200) including a battery (215) mechanically connected to a valve stem core (205); and a sensor assembly (1400), the valve stem (1300,1500) removably inserted in the sensor assembly (1400), the sensor assembly (1400) including a PC board (1440) with a pressure sensor (1420), where the battery (215) is electrically connected to the PC board (1440).

In some aspects, the techniques described herein relate to a pressure monitoring system further including a nut (405) threaded on the screw threads (1310,1510) of the valve stem (1300,1500), said nut (405) holding the pressure monitoring system to a tire rim (110).

In some aspects, the techniques described herein relate to a pressure monitoring system where the pressure sensor (1420) detects an air pressure in a tire attached to the tire rim.

In some aspects, the techniques described herein relate to a pressure monitoring system where the sensor assembly (1400) further includes a positive connector (1430) that mechanically and electrically contacts a positive terminal (216) on the battery (215).

In some aspects, the techniques described herein relate to a pressure monitoring system where the positive connector (1430) connects to wires that are connected to the PC board (1440).

In some aspects, the techniques described herein relate to a pressure monitoring system where the sensor assembly (1400) further includes a negative connector (1425) that mechanically and electrically contacts a negative terminal (217) on the battery (215).

In some aspects, the techniques described herein relate to a pressure monitoring system where the negative connector (1425) connects to wires that are connected to the PC board (1440).

In some aspects, the techniques described herein relate to a pressure monitoring system where the negative connector (1425) is in a hole at a bottom of the sensor assembly (1400).

In some aspects, the techniques described herein relate to a pressure monitoring system where the sensor assembly (1400) has screw threads (1435) for receiving the valve stem (1300) screw threads (1320) where the valve stem (1300) is inserted.

In some aspects, the techniques described herein relate to a pressure monitoring system where the sensor assembly (1400) has a divot for receiving a spring-loaded sphere (1530) on the valve stem (1500).

In some aspects, the techniques described herein relate to a pressure monitoring system where the valve stem insert (1200) is held in the hollow center (1535) of the valve stem (1300,1500) with screw threads (207).

In some aspects, the techniques described herein relate to a valve stem (1300,1500) apparatus including: a cylinder with a hollow center; a first set of screw threads (1305,1505) on an outer wall of the cylinder at a first end of the cylinder, the first set of screw threads (1305,1505) having an M8×1.0 external thread; a second set of screw threads (1310,1510), positioned towards a center of a length of the cylinder, on the outer wall of the cylinder, the second set of screw threads (1310,1510) having an M10×1.25 external thread; a removably secure attachment mechanism; a stem base (1325,1525) between the second set of screw threads (1310,1510) and the removably secure attachment mechanism; at least one air port (1315,1515) through the stem base, the at least one air port extending from a wall of the stem base to the hollow center; and a fourth set of screw threads on the first end of the cylinder on an inner wall of the cylinder.

In some aspects, the techniques described herein relate to a valve stem (1300,1500) apparatus further including a nut (405) threaded on the second set of screw threads (1310, 1510), said nut (405) configured to hold the valve stem apparatus (1300,1500) to a tire rim (110) against the stem base (1325,1525).

In some aspects, the techniques described herein relate to a valve stem (1300,1500) apparatus further including an air cap (120) threaded on the first set of screw threads (1305, 1505).

In some aspects, the techniques described herein relate to a valve stem (1300,1500) apparatus further including a valve stem insert (1200), the valve stem insert (1200) removably inserted into the hollow center of the valve stem apparatus (1300,1500).

In some aspects, the techniques described herein relate to a valve stem (1300,1500) apparatus where the valve stem insert (1200) includes a battery (215) mechanically connected to a valve stem core (205).

In some aspects, the techniques described herein relate to a valve stem (1300,1500) apparatus where the valve stem insert (1200) includes a valve stem core (205), the valve stem core (205) has a fifth set of screw threads (206).

In some aspects, the techniques described herein relate to a valve stem (1300,1500) apparatus where the fifth set of screw threads (206) is threaded into the fourth set of screw threads on the inner wall of the cylinder.

In some aspects, the techniques described herein relate to a valve stem (1300,1500) apparatus where a positive connector (216) of the battery is configured to electrically and mechanically connect to a positive wire connector (1430) in a sensor assembly (1400).

In some aspects, the techniques described herein relate to a valve stem (1300,1500) apparatus where a negative pole (217) of the battery (215) is configured to electrically and mechanically connect to a negative wire connector (1425) in a sensor assembly (1400).

In some aspects, the techniques described herein relate to a valve stem (1300) apparatus wherein the removably secure attachment mechanism is a third set of screw threads (1320), positioned at a second end of the cylinder, on the outer wall of the cylinder, the third set of screw threads (1320) having an M12×1.25 external thread.

In some aspects, the techniques described herein relate to a valve stem (1300) apparatus where the third set of screw threads (1320) is configured to thread into a sensor assembly (1400).

In some aspects, the techniques described herein relate to a valve stem (1500) apparatus wherein the removably secure attachment mechanism includes a spring-loaded sphere (1530).

In some aspects, the techniques described herein relate to a valve stem (1500) apparatus where the spring-loaded sphere (1530) is configured to insert into a divot in a sensor assembly (1400).

In scenarios representative of prior art (i.e. conventional, prior to the present disclosure) TPMS sensor usage, installing a conventional TPMS sensor onto a tire would have required the mechanic to dismount a tire from the tire rim, connect the valve stem to the proper hole of the sensor and battery housing, and connect a mounting screw. Then the user would insert the valve stem through the existing valve stem hole in a tire rim such that the sensor and battery housing area is mounted onto the tire rim while the valve stem or valve body protrudes through the valve stem hole of the tire rim through the opposite side. Once the valve stem was in place, the mounting screw may be tightened so that the sensor and battery housing area is flush with the outer surface of the tire rim and held in place. Next, the user would slide the washer, then the nut, then the cap onto the outer opening of the valve stem. The user may tighten the nut using one or more wrenches or other tools to achieve the proper amount of torque and further tighten the mounting screw.

In scenarios representative of prior art (i.e., conventional, prior to the present disclosure) TPMS sensor usage, TPMS sensors require specialized mechanics when the battery requires changing because the battery has to be carefully removed from the sensor and battery housing area, which is not a simple task. To remove an existing TPMS sensor installed on a tire, the mechanic has to remove the wheel (tire and rim) from a vehicle. The mechanic further removes the cap and removes the valve stem core from the valve stem to depressurize the tire of any air. The mechanic has to further break the bead of the tire with a tire mounting machine, and either remove the tire or use the machine to push the tire away from the tire rim to access the installed TPMS sensor. Next, the mechanic has to remove the nut and washer holding the valve stem assembly to the tire and detach the housing area from the valve stem assembly by unfastening the mounting screw and pulling the housing area away from the valve stem assembly. The mechanic may then open the protective back plate of the sensor and battery housing area and remove the coin shaped battery. This may further require removing any rubber protective coatings included inside of the sensor and battery housing area. The mechanic may then insert a new battery and proceed to reattach the sensor and battery housing area to a new valve stem assembly and reassemble the tire rim to the tire and install it on a vehicle. This process is time-consuming and not inexpensive to perform.

As used herein the phrases "connected to," "coupled to" and "in communication with" refer to any form of interaction between two or more entities, including but not limited to mechanical, electrical, magnetic, electromagnetic, fluid, thermal, thermodynamic or chemical interaction. Two components may be functionally coupled to each other even though they are not in direct contact with each other. The terms "abutting" or "in mechanical union" refer to items that are in direct physical contact with each other, although the items may not necessarily be attached together.

In various implementations, elements described herein as coupled or connected may have an effectual relationship realizable by a direct connection or indirectly with one or more other intervening elements.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

It is intended that the invention not be limited to the particular implementations disclosed for carrying out this invention, but that the invention will include all implementations falling within the scope of the present application as set forth in the following claims, wherein reference to an element in the singular, such as by use of the article "a" or "an" is not intended to mean "one and only one" unless specifically so stated, but rather "one or more." Moreover, no claim element is to be construed under the provisions of 35 U.S.C. § 112(f), unless the element is expressly recited using the phrase "means for" or "step for."

The respective reference numbers and descriptions of the elements depicted by the Drawings are summarized as follows.

TABLE 1

| Text | Ref Label |
|---|---|
| TPMS sensor assembly | 100 |
| Tire | 105 |
| tire rim | 110 |
| sensor body | 115 |
| air cap | 120 |
| valve stem | 200 |
| valve stem core | 205 |
| fifth set of screw threads | 206 |
| screw threads | 207 |
| battery retaining clip | 210 |
| battery | 215 |
| positive pole | 216 |
| negative pole | 217 |

TABLE 1-continued

| Text | Ref Label |
|---|---|
| insulator | 218 |
| positive electrical connection | 220a |
| negative electrical connection | 220b |
| positive electrical wiring | 225a |
| negative electrical wiring | 225b |
| sensor | 230 |
| nut | 235 |
| washer | 240 |
| attachment slot | 400 |
| nut | 405 |
| top outlet port | 500 |
| bottom outlet port | 505 |
| general interior opening | 800 |
| bar | 900 |
| lower area | 905 |
| valve stem insert | 1200 |
| metal pole | 1205 |
| valve stem | 1300 |
| air cap screw threads | 1305 |
| tire nut screw threads | 1310 |
| at least one air port | 1315 |
| sensor screw threads | 1320 |
| stem base | 1325 |
| sensor assembly | 1400 |
| PC board enclosure | 1405 |
| wire run | 1410 |
| sensor-stem interface | 1415 |
| pressure sensor | 1420 |
| negative contact | 1425 |
| positive contact | 1430 |
| threads | 1435 |
| PC board | 1440 |
| valve stem | 1500 |
| air cap screw threads | 1505 |
| tire nut screw threads | 1510 |
| at least one air port | 1515 |
| attachment block | 1520 |
| stem base | 1525 |
| sprint-loaded sphere | 1530 |
| hollow core | 1535 |

The following claims should be construed to maintain the proper protection for the present invention.

What is claimed is:

1. A pressure monitoring system comprising:
   a valve stem (1300,1500), the valve stem (1300,1500) being cylindrical in shape with a hollow center and screw threads on an outer wall, the valve stem (1300, 1500) including at least one air port (1315,1515) through the outer wall;
   a valve stem insert (1200), the valve stem insert (1200) removably inserted into the hollow center of the valve stem (1300,1500), the valve stem insert (1200) including a battery (215) mechanically connected to a valve stem core (205); and
   a sensor assembly (1400), the valve stem (1300,1500) removably inserted in the sensor assembly (1400), the sensor assembly (1400) including a PC board (1440) with a pressure sensor (1420), where the battery (215) is electrically connected to the PC board (1440).

2. The pressure monitoring system of claim 1 further comprising a nut (405) threaded on the screw threads (1310,1510) of the valve stem (1300,1500), said nut (405) holding the pressure monitoring system to a tire rim (110).

3. The pressure monitoring system of claim 2 where the pressure sensor (1420) detects an air pressure in a tire attached to the tire rim.

4. The pressure monitoring system of claim 1 where the sensor assembly (1400) further comprises a positive connector (1430) that mechanically and electrically contacts a positive terminal (216) on the battery (215).

5. The pressure monitoring system of claim 4 where the positive connector (1430) connects to wires that are connected to the PC board (1440).

6. The pressure monitoring system of claim 1 where the sensor assembly (1400) further comprises a negative connector (1425) that mechanically and electrically contacts a negative terminal (217) on the battery (215).

7. The pressure monitoring system of claim 6 where the negative connector (1425) connects to wires that are connected to the PC board (1440).

8. The pressure monitoring system of claim 6 where the negative connector (1425) is in a hole at a bottom of the sensor assembly (1400).

9. The pressure monitoring system of claim 1 where the sensor assembly (1400) has screw threads (1435) for receiving the valve stem (1300) screw threads (1320) where the valve stem (1300) is inserted.

10. The pressure monitoring system of claim 1 where the sensor assembly (1400) has a divot for receiving a spring-loaded sphere (1530) on the valve stem (1500).

11. The pressure monitoring system of claim 1 where the valve stem insert (1200) is held in the hollow center (1535) of the valve stem (1300,1500) with screw threads (207).

12. A valve stem (1300,1500) apparatus comprising:
a cylinder with a hollow center;
a first set of screw threads (1305,1505) on an outer wall of the cylinder at a first end of the cylinder, the first set of screw threads (1305,1505) having an M8×1.0 external thread;
a second set of screw threads (1310,1510), positioned towards a center of a length of the cylinder, on the outer wall of the cylinder, the second set of screw threads (1310,1510) having an M10×1.25 external thread;
a removably secure attachment mechanism;
a stem base (1325,1525) between the second set of screw threads (1310,1510) and the removably secure attachment mechanism;
at least one air port (1315,1515) through the stem base, the at least one air port extending from a wall of the stem base to the hollow center; and
a fourth set of screw threads on the first end of the cylinder on an inner wall of the cylinder.

13. The valve stem (1300,1500) apparatus of claim 12 further comprising a nut (405) threaded on the second set of screw threads (1310,1510), said nut (405) configured to hold the valve stem apparatus (1300,1500) to a tire rim (110) against the stem base (1325,1525).

14. The valve stem (1300,1500) apparatus of claim 12 further comprising an air cap (120) threaded on the first set of screw threads (1305,1505).

15. The valve stem (1300,1500) apparatus of claim 12 further comprising a valve stem insert (1200), the valve stem insert (1200) removably inserted into the hollow center of the valve stem apparatus (1300,1500).

16. The valve stem (1300,1500) apparatus of claim 15 where the valve stem insert (1200) includes a battery (215) mechanically connected to a valve stem core (205).

17. The valve stem (1300,1500) apparatus of claim 15 where the valve stem insert (1200) includes a valve stem core (205), the valve stem core (205) has a fifth set of screw threads (206).

18. The valve stem (1300,1500) apparatus of claim 17 where the fifth set of screw threads (206) is threaded into the fourth set of screw threads on the inner wall of the cylinder.

19. The valve stem (1300,1500) apparatus of claim 16 where a positive connector (216) of the battery is configured to electrically and mechanically connect to a positive wire connector (1430) in a sensor assembly (1400).

20. The valve stem (1300,1500) apparatus of claim 16 where a negative pole (217) of the battery (215) is configured to electrically and mechanically connect to a negative wire connector (1425) in a sensor assembly (1400).

21. The valve stem (1300) apparatus of claim 12 wherein the removably secure attachment mechanism is a third set of screw threads (1320), positioned at a second end of the cylinder, on the outer wall of the cylinder, the third set of screw threads (1320) having an M12×1.25 external thread.

22. The valve stem (1300) apparatus of claim 21 where the third set of screw threads (1320) is configured to thread into a sensor assembly (1400).

23. The valve stem (1500) apparatus of claim 12 wherein the removably secure attachment mechanism includes a spring-loaded sphere (1530).

24. The valve stem (1500) apparatus of claim 23 where the spring-loaded sphere (1530) is configured to insert into a divot in a sensor assembly (1400).

* * * * *